(12) United States Patent
Ohteru et al.

(10) Patent No.: US 10,193,630 B2
(45) Date of Patent: Jan. 29, 2019

(54) STATION-SIDE DEVICE AND OPTICAL TRANSMISSION SYSTEM

(71) Applicant: NIPPON TELEGRAPH AND TELEPHONE CORPORATION, Tokyo (JP)

(72) Inventors: Shoko Ohteru, Tokyo (JP); Namiko Ikeda, Tokyo (JP); Saki Hatta, Tokyo (JP); Satoshi Shigematsu, Tokyo (JP); Nobuyuki Tanaka, Tokyo (JP); Kenji Kawai, Tokyo (JP); Junichi Kato, Tokyo (JP); Tomoaki Kawamura, Tokyo (JP); Hiroyuki Uzawa, Tokyo (JP); Yuki Arikawa, Tokyo (JP); Naoki Miura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/555,960

(22) PCT Filed: Mar. 4, 2016

(86) PCT No.: PCT/JP2016/056776
§ 371 (c)(1),
(2) Date: Sep. 5, 2017

(87) PCT Pub. No.: WO2016/143692
PCT Pub. Date: Sep. 15, 2016

(65) Prior Publication Data
US 2018/0062746 A1 Mar. 1, 2018

(30) Foreign Application Priority Data

Mar. 6, 2015 (JP) .................. 2015-044713
Mar. 6, 2015 (JP) .................. 2015-044721
Mar. 6, 2015 (JP) .................. 2015-045207

(51) Int. Cl.
*H04J 14/08* (2006.01)
*H04B 10/27* (2013.01)
(Continued)

(52) U.S. Cl.
CPC ............ *H04B 10/27* (2013.01); *H04B 10/038* (2013.01); *H04B 10/272* (2013.01); *H04B 10/40* (2013.01);
(Continued)

(58) Field of Classification Search
CPC ...... H04B 10/27; H04B 10/038; H04B 10/40; H04J 14/08
See application file for complete search history.

(56) References Cited

U.S. PATENT DOCUMENTS

2012/0030380 A1   2/2012  Yanagimachi
2012/0128357 A1*  5/2012  Mukai ................. H04B 10/272
                                          398/58

(Continued)

FOREIGN PATENT DOCUMENTS

JP   2008-283461 A   11/2008
JP   2012-019353 A    1/2012

(Continued)

OTHER PUBLICATIONS

"Technical Tutorial Lecture [GE-PON Technologies] Part 1, What is PON?", NTT Technical Journal, vol. 17 No. 8, pp. 71-74, 2005.

(Continued)

*Primary Examiner* — Dzung Tran
(74) *Attorney, Agent, or Firm* — Womble Bond Dickinson (US) LLP

(57) ABSTRACT

A selection and distribution circuit (13) is provided between N optical transceivers (11) and one PON control circuit (12). The selection and distribution circuit (13) selects the optical transceiver (11) corresponding to an upstream frame that (Continued)

time-divisionally arrives, thereby transferring the upstream frame opto-electrically converted by the transceiver (11) to the PON control circuit (12) and distributing a downstream frame from the PON control circuit (12) to each optical transceiver (11). A power supply control circuit (23) stops power supply to at least one of one of optical transceivers (11) that are not used to transfer the frame of the optical transceivers (11) and a circuit that is not used to transfer the frame in the selection and distribution circuit (13). This can reduce the system cost per ONU in the optical transmission system.

10 Claims, 20 Drawing Sheets

(51) Int. Cl.
*H04B 10/272* (2013.01)
*H04L 12/44* (2006.01)
*H04B 10/038* (2013.01)
*H04B 10/40* (2013.01)
*H04J 14/02* (2006.01)

(52) U.S. Cl.
CPC .......... *H04J 14/0221* (2013.01); *H04J 14/08* (2013.01); *H04L 12/44* (2013.01)

(56) References Cited

U.S. PATENT DOCUMENTS

| | | | |
|---|---|---|---|
| 2012/0177361 A1* | 7/2012 | Hirano | H04B 10/272 398/1 |
| 2012/0288279 A1* | 11/2012 | Zhang | H04B 10/272 398/66 |
| 2014/0212139 A1* | 7/2014 | Murata | H04L 12/2861 398/66 |
| 2014/0219654 A1 | 8/2014 | Mitsui et al. | |
| 2015/0171965 A1 | 6/2015 | Ohteru et al. | |

FOREIGN PATENT DOCUMENTS

| | | |
|---|---|---|
| JP | 2013-192064 A | 9/2013 |
| JP | 2014-068213 A | 4/2014 |
| JP | 2015-056671 A | 3/2015 |
| WO | 2009/054581 A1 | 4/2009 |
| WO | WO 2010/123143 A1 | 10/2010 |
| WO | 2013/183628 A1 | 12/2013 |

OTHER PUBLICATIONS

Supplementary European Search Report and Written Opinion received for EP Patent Application No. 16761662.2, dated Oct. 5, 2018, 10 pages.

\* cited by examiner

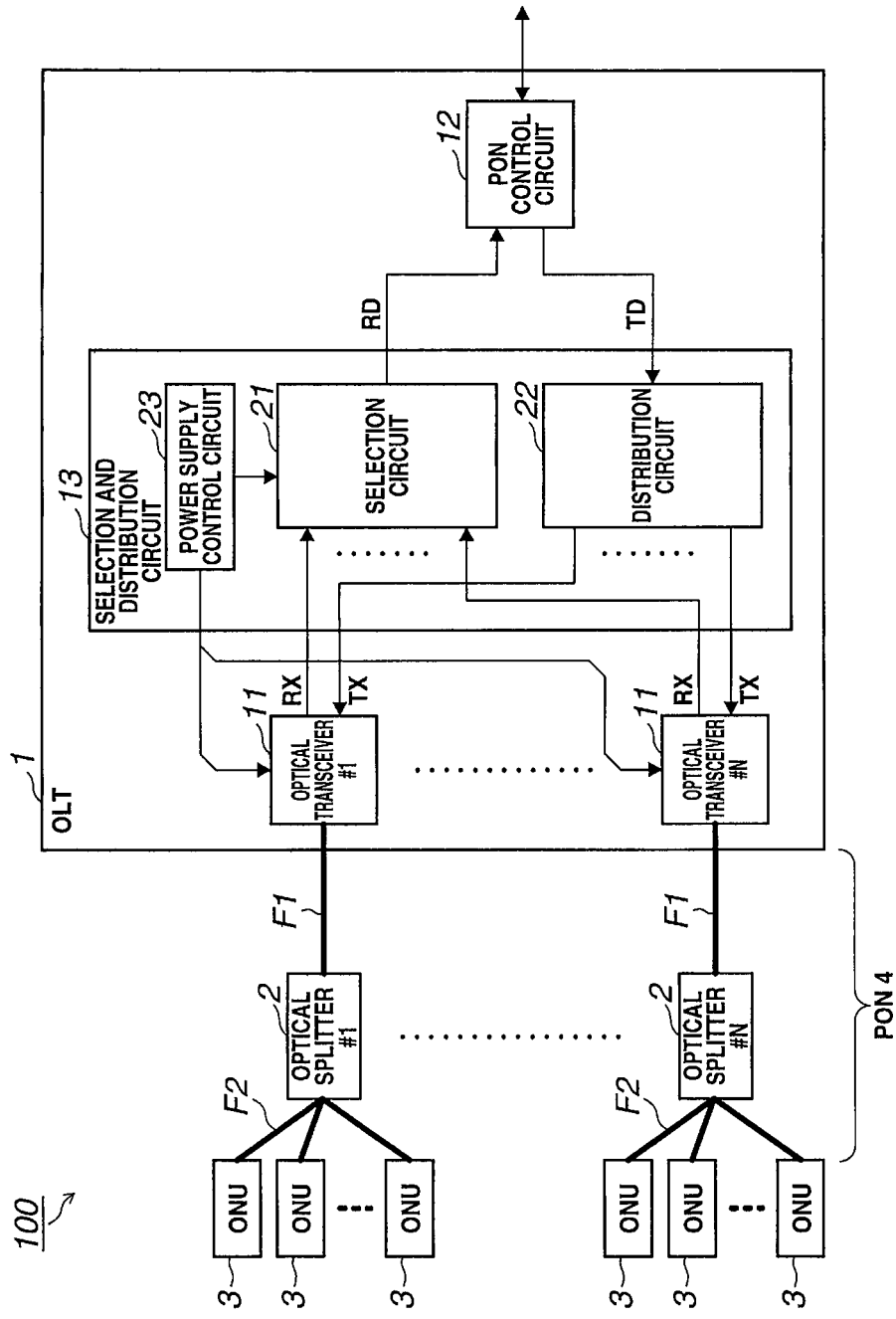

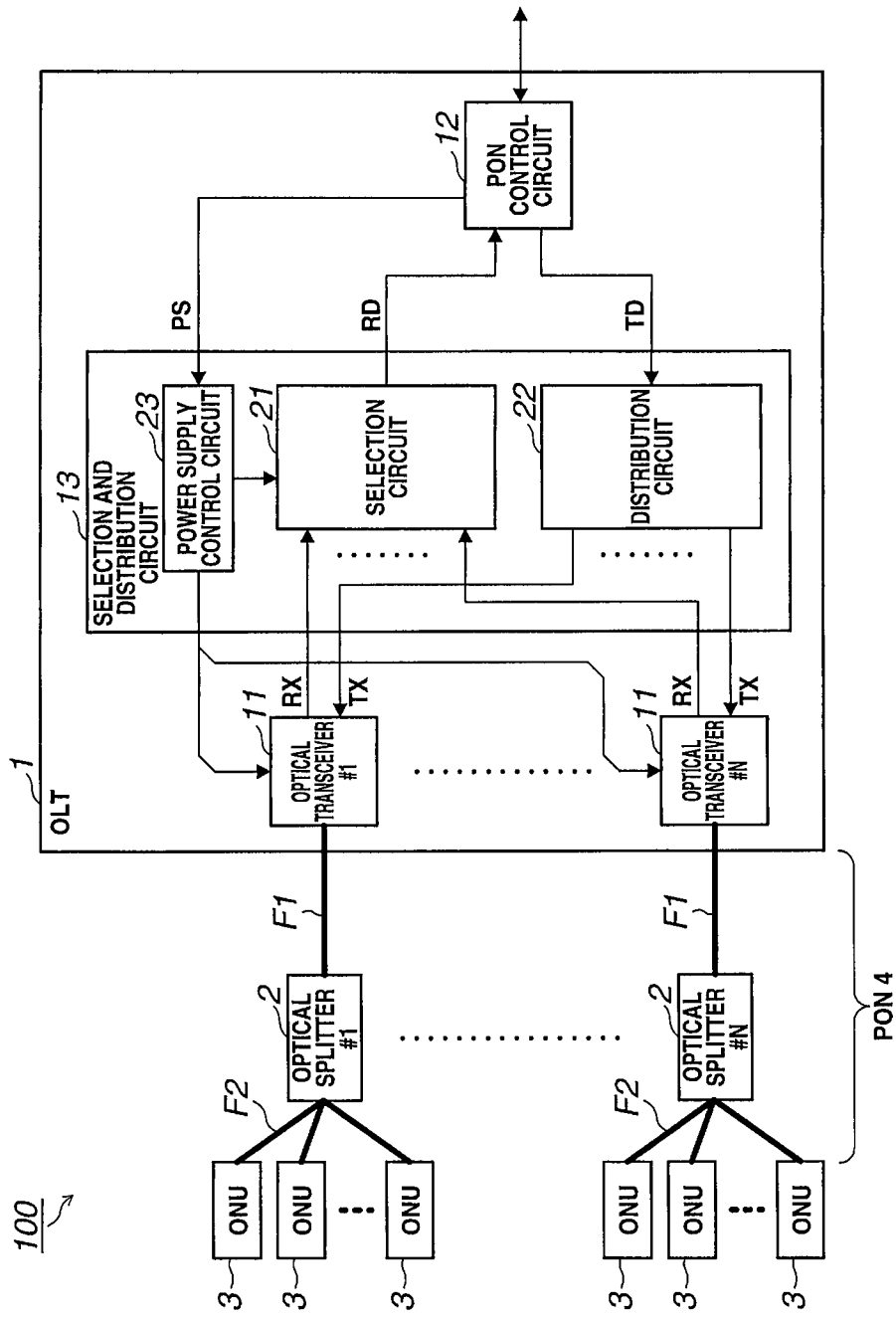

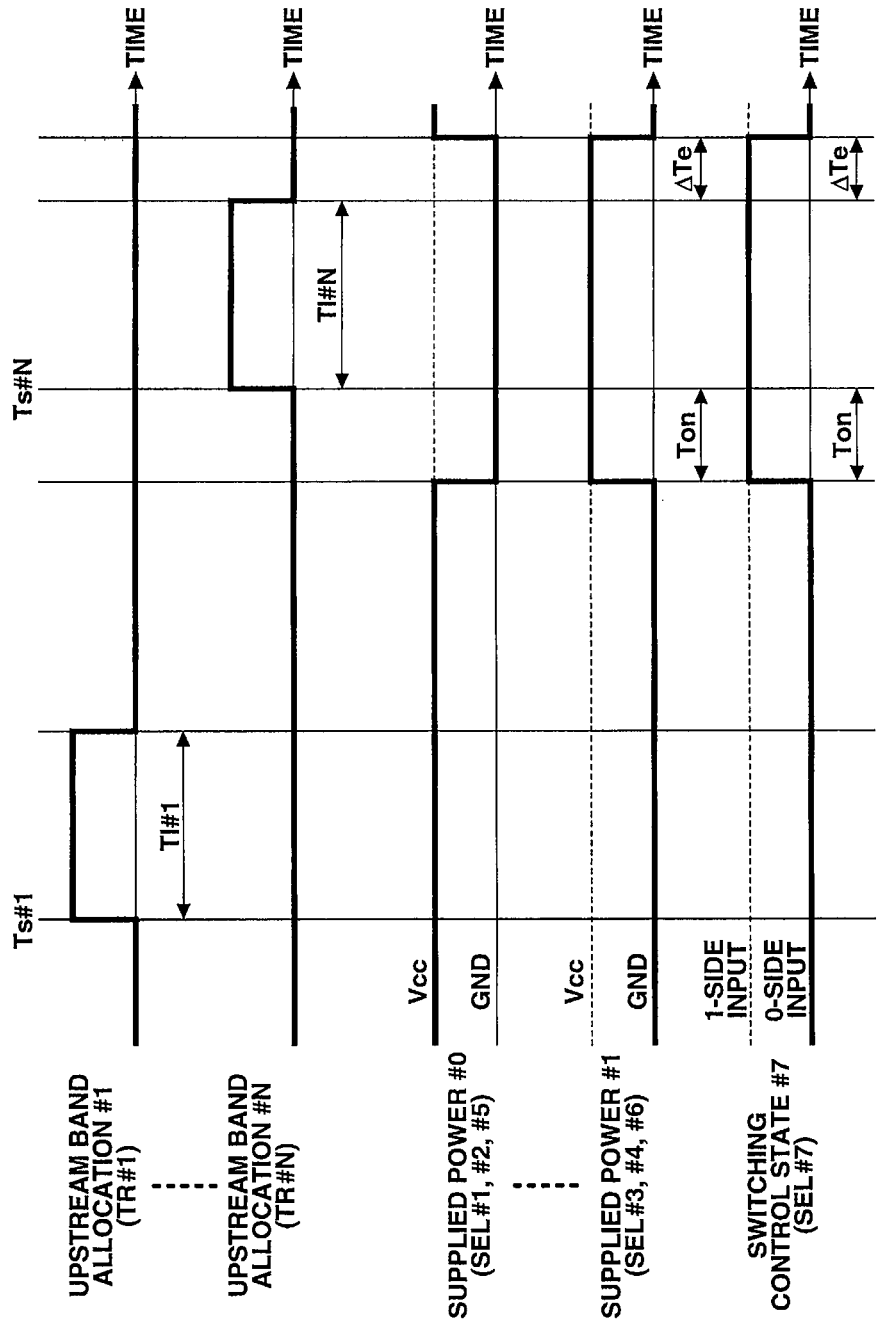

ized-multiplexing the upstream frames and the downstream frames, which are exchanged between the N optical transceivers and the PON control circuit, wherein the PON control circuit assigns, to the subscriber-side devices of transmission sources of the upstream frames from the N optical transceivers, time slots different from each other as upstream transmission permission times, and simultaneously transmits the downstream frames from the N optical transceivers to the subscriber-side devices.

STATION-SIDE DEVICE AND OPTICAL TRANSMISSION SYSTEM

TECHNICAL FIELD

The present invention relates to an OLT (station-side device: Optical Line Terminal) in an optical transmission system configured to perform transfer processing of frames between a plurality of ONUs (subscriber-side devices: Optical Network Units) and a host device, which are connected via a PON (optical communication network: Passive Optical Network), and the optical transmission system and, more particularly, to an OLT configured to enable efficient communication with a number of ONUs and an optical transmission system.

BACKGROUND ART

As a PON used in an optical access system such as an FTTH (Fiber To The Home) recently, standardization of 10G-EPON (10 Gigabit Ethernet Passive Optical Network: Ethernet is a registered trademark) was completed by IEEE802.3av in 2009. As a feature, the 10G-EPON can perform high-speed transfer 10 times faster than already widespread GE-PON (Gigabit Ethernet Passive Optical Network: see non-patent literature 1). As another feature, the existing GE-PON and the 10G-EPON can be used by mixture.

To use the GE-PON and the 10G-EPON by mixture, a WDM (Wavelength Division Multiplexing) technique that uses different wavelengths for a 1G downstream signal and a 10G downstream signal is used, and a TDM (Time Division Multiplexing) technique is used between 1G downstream signals and between 10G downstream signals. In upstream signals, the same wavelength is used for a 1G upstream signal and a 10G upstream signal, and a TDMA (Time Division Multiple Access) technique is used for both of the 1G upstream signal and the 10G upstream signal. That is, three different wavelengths are used for the 1G downstream signal, the 10G downstream signal, and the upstream signals.

Such an optical transmission system using the GE-PON or 10G-EPON is called a GE-PON system or 10G-EPON system.

FIG. 17 shows an arrangement example of a conventional GE-PON system. The GE-PON system is formed from an OLT (station-side device) 50, an optical splitter 2, and a plurality of ONUs (subscriber-side devices) 3. The plurality of ONUs 3 connected via the optical splitter 2 are accommodated in the OLT 50.

The OLT 50 for GE-PON incorporates an optical transceiver 51 and a PON control circuit 52. In the OLT 50, the optical transceiver 51 performs electro-optic conversion of a downstream frame to each ONU 3 connected to the optical transceiver 51 and opto-electric conversion of an upstream frame from each ONU 3. The PON control circuit 52 transfers an upstream frame from the ONU 3, which is received by the optical transceiver 51, to a host device (not shown), and transfers a downstream frame received from the host device to the optical transceiver 51.

FIG. 18 shows another arrangement example of the conventional GE-PON system. In the OLT 50, the number of ONUs 3 connectable to one optical transceiver 51 is defined by the IEEE standard as 32 at maximum. For this reason, if the OLT 50 serving as a station configured to accommodate the ONUs 3 needs to connect 33 or more ONUs 3, a plurality of optical splitters 2 are provided between the OLT 50 and the ONUs 3, as shown in FIG. 18, and a plurality of optical transceivers 51 and a plurality of PON control circuits 52 are used as a general arrangement.

RELATED ART LITERATURE

Patent Literature

Patent Literature 1: Japanese Patent Laid-Open No. 2012-19353

Non-Patent Literature

Non-Patent Literature 1: "Technical Tutorial Lecture [GE-PON Technologies] Part 1, What is PON?", NTT Technical Journal, Vol. 17. No. 8, pp. 71-74, 2005.

DISCLOSURE OF INVENTION

Problem to be Solved by the Invention

Even in a 10G-EPON system, the number of ONUs 3 connectable to one optical transceiver 51 is defined by the IEEE standard as 32 at maximum. However, a PON control device for 10G-EPON is required to have higher performance (a data transfer rate 10 times higher) than a PON control device for GE-PON, and the device cost (the purchase price of the device) is also high. Hence, as a problem to be solved to employ the 10G-EPON system, the system cost per ONU needs to be reduced as much as possible.

As one measure to the above problem, the number of ONUs connectable to one optical transceiver is increased to decrease the numbers of optical transceivers and PON control circuits to be used. For example, there has been proposed a technique of enabling connection of 33 or more ONUs by using an optical amplifier (see, for example, patent literature 1).

However, the device cost (the purchase price of the device) of the optical amplifier is higher than that of a part (for example, an LSI) for an electric circuit. In addition, power consumption of ONUs increases along with an increase in the scale of the electric circuit, and not only the device cost but also the operation cost increases. Hence, the system cost per ONU in the optical transmission system increases.

The present invention has been made to solve the above-described problems, and has as its object to reduce the system cost per ONU in an optical transmission system.

Means of Solution to the Problem

In order to achieve the object, according to the present invention, there is provided a station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices, a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times, a selection and distribution circuit configured to select the optical transceivers corresponding to the upstream frames that time-divisionally arrive such that the upstream frames opto-electrically converted by the selected optical transceivers are transferred to the PON control circuit, and distribute the downstream frames from the PON control circuit to the optical transceivers, and a power supply control circuit configured to stop power supply to at least one of the optical transceivers that are not used to transfer the frame of the optical transceivers and the selection and distribution circuit which is not used to transfer the frames.

According to the present invention, there is also provided an optical transmission system comprising N (N is an integer of not less than 2) optical splitters and a station-side device configured to perform transfer processing of frames between a plurality of subscriber-side devices connected to the station-side device via the optical splitters and a host device, wherein the station-side device comprises any one of the above-mentioned station-side devices.

Effect of the Invention

According to the present invention, in the OLT, N×32 ONUs are accommodated at maximum, and power supply to some or all of circuits that are not used to transfer upstream frames transmitted from the ONUs is stopped. It is therefore possible to reduce the device cost per ONU in the optical transmission system and also reduce the operation cost by reducing power consumption in the OLT. As a result, the system cost per ONU in the optical transmission system, including the device cost and the operation cost, can be reduced.

BRIEF DESCRIPTION OF DRAWINGS

FIG. 1 is a block diagram showing the arrangement of an optical transmission system and an OLT according to the first embodiment;

FIG. 2 is a block diagram showing the arrangement of an optical transmission system and an OLT according to the second embodiment;

FIG. 14B is a timing chart showing the operation of the power supply control circuit shown in FIG. 14A;

BEST MODE FOR CARRYING OUT THE INVENTION

Figure 3A:
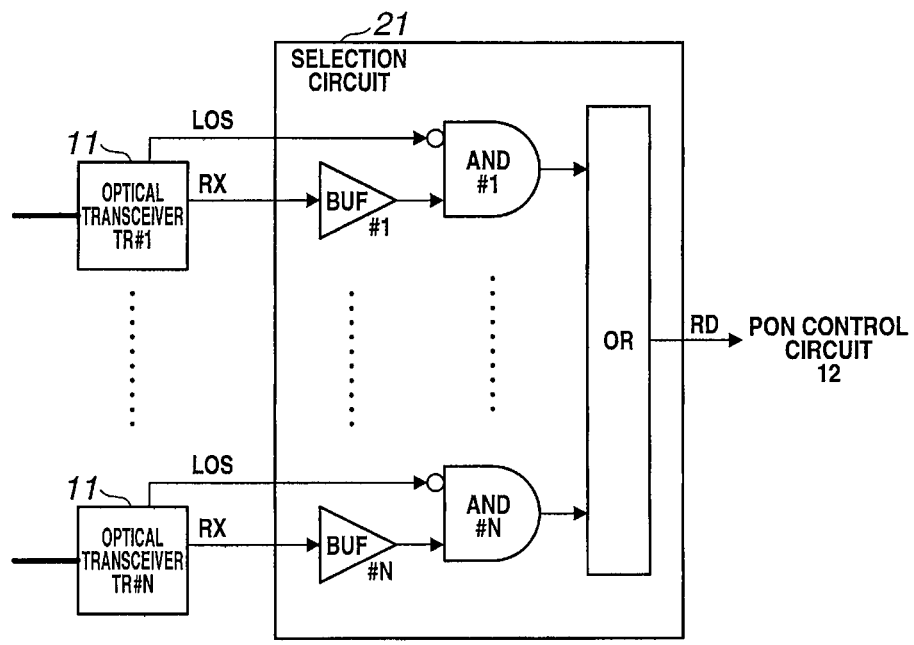
FIG. 3A is a block diagram showing an arrangement example of a selection circuit according to the second embodiment.

Embodiments of the present invention will now be described with reference to the accompanying drawings.

First Embodiment

First, an optical transmission system 100 and an OLT (station-side device) 1 according to the first embodiment of the present invention will be described with reference to FIG. 1. FIG. 1 is a block diagram showing the arrangement of the optical transmission system and the OLT according to the first embodiment.

The optical transmission system 100 is an optical communication system used in, for example, FTTH (Fiber To The Home), and has a function of transit-connecting a plurality of ONUs (subscriber-side devices: Optical Network Units) connected to the OLT (station-side device: Optical Line Terminal) 1 via an optical communication network 4 to a host device (not shown) by the OLT 1, thereby mutually transferring frames between each ONU 3 and the host device.

The optical transmission system 100 is configured to perform frame communication between the OLT 1 and each ONU 3 by transmitting/receiving an optical signal via an optical splitter 2 and optical fibers F1 and F2, and perform frame communication between the OLT 1 and the host device via a host network (not shown) such as the Internet.

A detailed example of the optical communication network 4 is a PON (Passive Optical Network) system such as GE-PON standardized by IEEE802.3ah or 10G-EPON standardized by IEEE802.3av.

In the present invention, a case in which the optical transmission system 100 is formed from a GE-PON system or 10G-EPON system using a PON such as GE-PON or 10G-EPON as the optical communication network 4 will be described as an example. However, the present invention is not limited to this, and is also applicable to an optical transmission system using another optical communication network.

[Optical Transmission System]

As shown in FIG. 1, the optical transmission system 100 according to the present invention includes the OLT (station-side device) 1, the optical splitters 2, and the ONUs (subscriber-side devices) 3.

The OLT 1 accommodates the plurality of ONUs 3 connected via the optical splitters 2 and the optical fibers F1 and F2. One of optical transceivers 11 (TR#1 to TR#N) is connected to a corresponding one of optical splitters 2 (SP#1 to SP#N) via the optical fiber F1. To each of the optical splitters 2 (SP#1 to SP#N), 32 ONUs 3 are commonly connected at maximum via the optical fibers F2. Accordingly, a total of N×32 ONUs 3 can be connected at maximum to the OLT 1 including N optical transceivers 11 (TR#1 to TR#N).

[OLT]

As shown in FIG. 1, the OLT 1 includes, as main circuit portions, the N (N≥2: N is an integer of 2 or more) optical transceivers 11 (TR#1 to TR#N), one PON control circuit 12, and one selection and distribution circuit 13.

Each of the optical transceivers 11 (TR#1 to TR#N) is connected to a corresponding one of the optical splitters 2 (SP#1 to SP#N) via the optical fiber F1 in a one-to-one correspondence, and has a function of performing opto-electric conversion of upstream frames from the ONUs 3 connected to the corresponding one of the optical splitters 2 (SP#1 to SP#N) to the host device (not shown) and a function of performing electro-optic conversion of downstream frames from the host device to the ONUs 3.

The PON control circuit 12 has a function of transmitting/receiving an electrical signal to/from the host network to exchange an upstream frame and a downstream frame with the host device, and a function of time-divisionally allocating a communication band for upstream frame transmission to the ONUs 3 such that the ONUs 3 transmit upstream frames at different times.

The selection and distribution circuit 13 has a function of selecting one of the optical transceivers 11 (TR#1 to TR#N) corresponding to an upstream frame that time-divisionally arrives from each ONU 3, thereby transferring the upstream frame opto-electrically converted by the selected optical transceiver 11 to the PON control circuit 12, and a function of distributing a downstream frame that the PON control circuit 12 receives from the host device to each of the optical transceivers 11 (TR#1 to TR#N).

Figure 18:
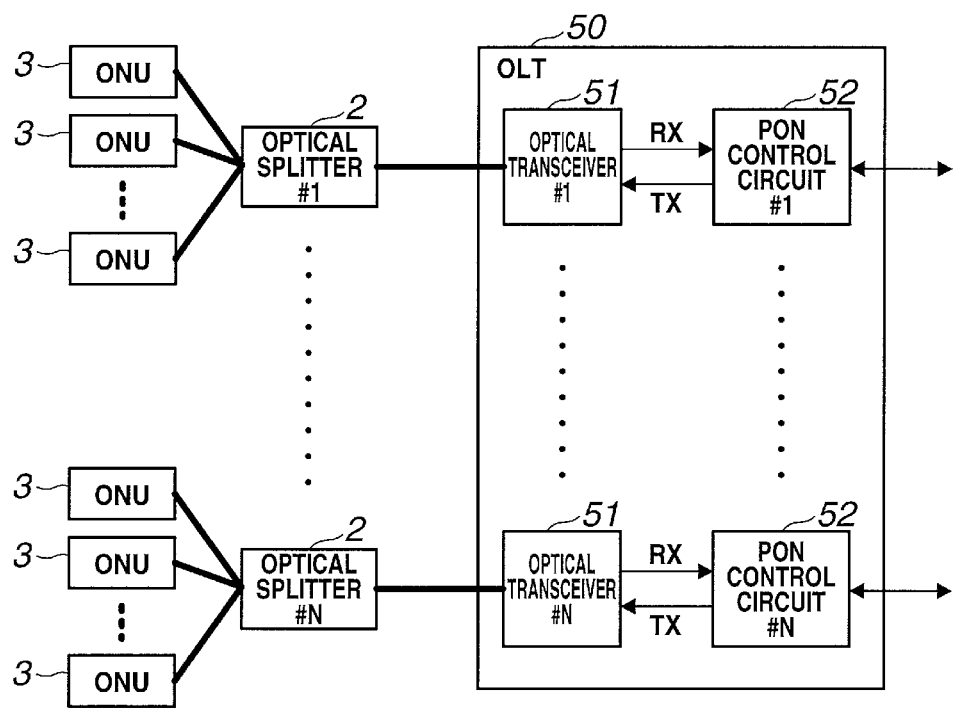
FIG. 18 is a block diagram showing another arrangement example of the conventional GE-PON system.

The optical transmission system 100 according to this embodiment is structurally different from the conventional GE-PON system shown in FIG. 18 described above in that one PON control circuit 12 is provided, and one selection and distribution circuit 13 is provided between the one PON control circuit 12 and the N optical transceivers 11 (TR#1 to TR#N).

As shown in FIG. 1, the selection and distribution circuit 13 according to this embodiment includes, as main circuit portions, a selection circuit 21, a distribution circuit 22, and a power supply control circuit 23.

The selection circuit 21 has a function of selecting one of upstream frame outputs RX from the optical transceivers 11 (TR#1 to TR#N) and outputting it to the PON control circuit 12.

The distribution circuit 22 has a function of distributing downstream frames output from the PON control circuit 12 to the optical transceivers 11 (TR#1 to TR#N).

The power supply control circuit 23 has a function of stopping power supply to at least one of an optical transceiver 11 which is not used to transfer a frame and a circuit in the selection and distribution circuit 13 which is not used to transfer an upstream frame or downstream frame.

Note that in this embodiment, the selection circuit 21 and the distribution circuit 22 will be described as separate circuits. However, these may be implemented as an integrated circuit. The power supply control circuit 23 will be described as a circuit incorporated in the selection and distribution circuit 13 and separate from the selection circuit 21. However, these may be implemented as an integrated circuit.

Effects of First Embodiment

As described above, in this embodiment, the selection and distribution circuit 13 is provided between the N optical transceivers 11 and one PON control circuit 12. The selection and distribution circuit 13 selects the optical transceiver 11 corresponding to an upstream frame that time-divisionally arrives, thereby transferring the upstream frame opto-electrically converted by the transceiver 11 to the PON control circuit 12. The selection and distribution circuit 13 also distributes a downstream frame from the PON control circuit 12 to each optical transceiver 11. The power supply control circuit 23 stops power supply to at least one of the optical transceiver 11 of the optical transceivers 11, which is not used to transfer a frame, and a circuit in the selection and distribution circuit 13, which is not used to transfer a frame.

Accordingly, in the OLT 1, N×32 ONUs 3 are accommodated at maximum, and power supply to the optical transceiver 11 and circuits in the selection and distribution circuit 13 which are not used to transfer an upstream frame or downstream frame is stopped.

It is therefore possible to reduce the device cost per ONU in the optical transmission system 100 and also reduce the operation cost by reducing power consumption in the OLT 1. As a result, the system cost per ONU in the optical transmission system, including the device cost and the operation cost, can be reduced.

Second Embodiment

An optical transmission system 100 and an OLT (station-side device) 1 according to the second embodiment of the present invention will be described next with reference to FIG. 2. FIG. 2 is a block diagram showing the arrangement of the optical transmission system and the OLT according to the second embodiment.

In this embodiment, as a detailed example of power supply control in the above-described first embodiment, a power supply control circuit 23 stops power supply to a resting optical transceiver 11 set in a rest state in the optical transceivers 11 based on an operation status PS concerning the optical transceivers 11.

[Arrangement Example 1 of Selection and Distribution Circuit]

First, arrangement example 1 of a selection and distribution circuit 13 according to this embodiment will be described with reference to FIGS. 3A and 3B.

FIG. 3A shows an arrangement example of a selection circuit according to the second embodiment. A selection circuit 21 includes, as main circuit portions, N AND circuits (AND#1 to AND#N) and N buffer circuits (BUF#1 to BUM), which correspond to the N optical transceivers 11 (TR#1 to TR#N), respectively, and one N-input OR circuit (OR).

Each of AND circuits (AND#1 to AND#N) is formed from a general AND gate, and has a function of receiving an upstream frame output RX and a LOS output (inverted value) output from a corresponding one of the optical transceivers 11 (TR#1 to TR#N) and outputting the AND of the upstream frame output RX and the inverted value of the LOS output.

Here, the LOS output is a negative logic signal representing whether an optical signal from an optical splitter 2 is input to one of the optical transceivers 11 (TR#1 to TR#N). If no optical signal is input, the LOS output is "1". If an optical signal is input, the LOS output is "0".

Accordingly, if the LOS output is "0", and an optical signal is input, each of the AND circuits (AND#1 to AND#N) outputs the input upstream frame output RX. If the LOS output is "1", and no optical signal is input, each of the AND circuits (AND#1 to AND#N) stops outputting the upstream frame output RX and outputs "0".

Hence, in each of the AND circuits (AND#1 to AND#N), the upstream frame output RX output from a corresponding one of the optical transceivers 11 (TR#1 to TR#N) is masked (gating) by the LOS output (inverted value).

The OR circuit (OR) is formed from a general N-input OR gate, and has a function of outputting the OR of N AND outputs from the AND circuits (AND#1 to AND#N) to the PON control circuit 12 as an upstream frame output RD.

Accordingly, the upstream frame output RX from an optical transceiver TR#i (i is an integer of 1 to N) of the optical transceivers 11 (TR#1 to TR#N) to which an optical signal is input is input to the OR circuit (OR) via the corresponding one of the AND circuits (AND#1 to AND#N), and the OR of upstream frame outputs is output as the upstream frame output RD.

Hence, to correctly receive the upstream frame output RX, the AND circuits (AND#1 to AND#N) need to time-divisionally mask the upstream frame outputs RX so that the upstream frame outputs RX from the plurality of optical transceivers 11 (TR#1 to TR#N) are not simultaneously input to the OR circuit (OR).

This can be implemented by causing the PON control circuit 12 to perform time division control of all the ONUs 3 that have established sessions with the OLT 1 via the optical splitters 2 so that the ONUs 3 do not simultaneously emit light (transmit upstream frames).

In a conventional PON system, to prevent a plurality of ONUs connected to one optical splitter from simultaneously emitting light (transmitting upstream frames), an OLT performs upstream band allocation (grant allocation) to the ONUs by an algorithm such as DBA (Dynamic Bandwidth Allocation).

In the OLT 1 according to this embodiment, the PON control circuit 12 performs, using such an algorithm, upstream band allocation (grant allocation) of time-divisionally allocating a communication band for upstream frame transmission to all the ONUs 3 that have established sessions with the OLT 1 in the maximum number of N×32 ONUs 3 connected to the N optical splitters 2 (SP#1 to SP#N) such that the ONUs 3 emit light (transmit upstream frames) at different times.

Accordingly, only one ONU 3 of the ONUs 3 emits light (transmits an upstream frame), and only the LOS output from one optical transceiver 11 accommodating the ONU 3 changes to "0".

Note that as for a register request frame that is a control frame used to, for example, request connection of a new ONU 3, a plurality of ONUs 3 are allowed to simultaneously emit light (transmit upstream frames) in the IEEE standard. For this reason, in a period (discovery window) to permit transmission of the register request frame, the LOS outputs of a plurality of optical transceivers 11 may simultaneously change to 0. If the LOS outputs are simultaneously 0, the PON control circuit 12 may be unable to normally receive the register request frame.

However, as for the period (discovery window) to permit transmission of the register request frame, a plurality of ONUs connected to the same optical splitter may simultaneously transmit the register request frames even in the conventional PON system. In this case, the specifications allow the OLT 1 to neglect (discard) a register request frame that cannot be normally received. Even the OLT 1 according to this embodiment is allowed by the specifications to neglect (discard) a register request frame that the PON control circuit 12 cannot normally receive.

Figure 3B:
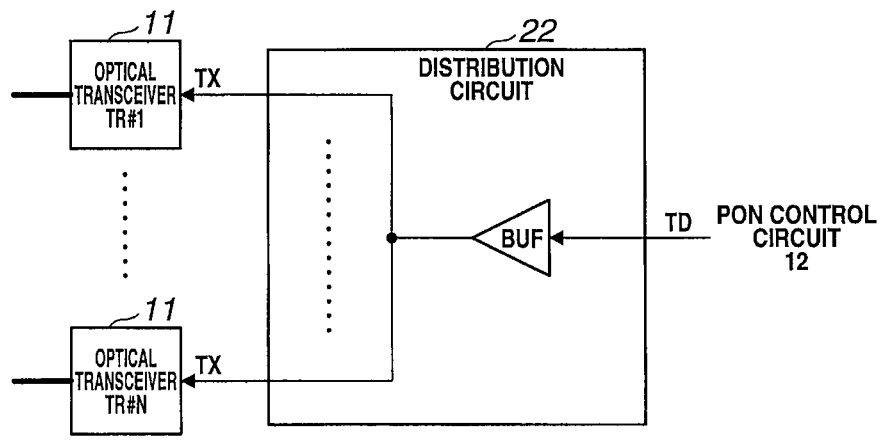
FIG. 3B is a block diagram showing an arrangement example of a distribution circuit according to the second embodiment.

FIG. 3B shows an arrangement example of a distribution circuit according to the second embodiment. A distribution circuit 22 includes, as a main circuit portion, a buffer circuit BUF configured to distribute a downstream frame output TD from the PON control circuit 12 as downstream frame outputs TX to the N optical transceivers 11 (TR#1 to TR#N) in parallel. Accordingly, the downstream frame output TD from the PON control circuit 12 is distributed from the buffer circuit as the downstream frame outputs TX to the optical transceivers 11 (TR#1 to TR#N) in parallel.

At this time, the downstream frames are simultaneously distributed to the ONUs 3 via the optical transceivers 11 (TR#1 to TR#N). Each ONU 3 confirms the destination of the downstream frame received from the OLT 1 and discards the downstream frame that is not addressed to the ONU 3. For this reason, even if the downstream frames are simultaneously distributed to the ONUs 3, the frames are not erroneously received. This mechanism is the same as in the conventional PON system.

The PON control circuit 12 has not only the function of performing upstream band allocation (grant allocation) to all the ONUs 3 connected to the optical splitters 2 (SP#1 to SP#N) so that the plurality of ONUs 3 do not simultaneously emit light (transmit upstream frames), as described above, but also a function of performing transfer processing of an upstream frame and a downstream frame, like the conventional PON control circuit.

Additionally, if the same optical transceivers as in the conventional PON system are used as the optical transceivers 11, the OLT 1 according to this embodiment can communicate with "N×32" ONUs 3 at maximum. For example, if N=4, communication with 128 ONUs 3 is possible at maximum. If N=16, communication with 512 ONUs 3 is possible at maximum.

[Arrangement Example 2 of Selection and Distribution Circuit]

Arrangement example 2 of the selection and distribution circuit 13 according to this embodiment will be described next with reference to FIG. 3C.

When the power supply control circuit 23 is provided for the selection circuit 21 shown in FIG. 3A, power supply to circuit portions corresponding to the optical transceivers 11 (TR#1 to TR#N) at which no upstream frame has arrived can be stopped, and power consumption can be reduced.

Figure 3C:
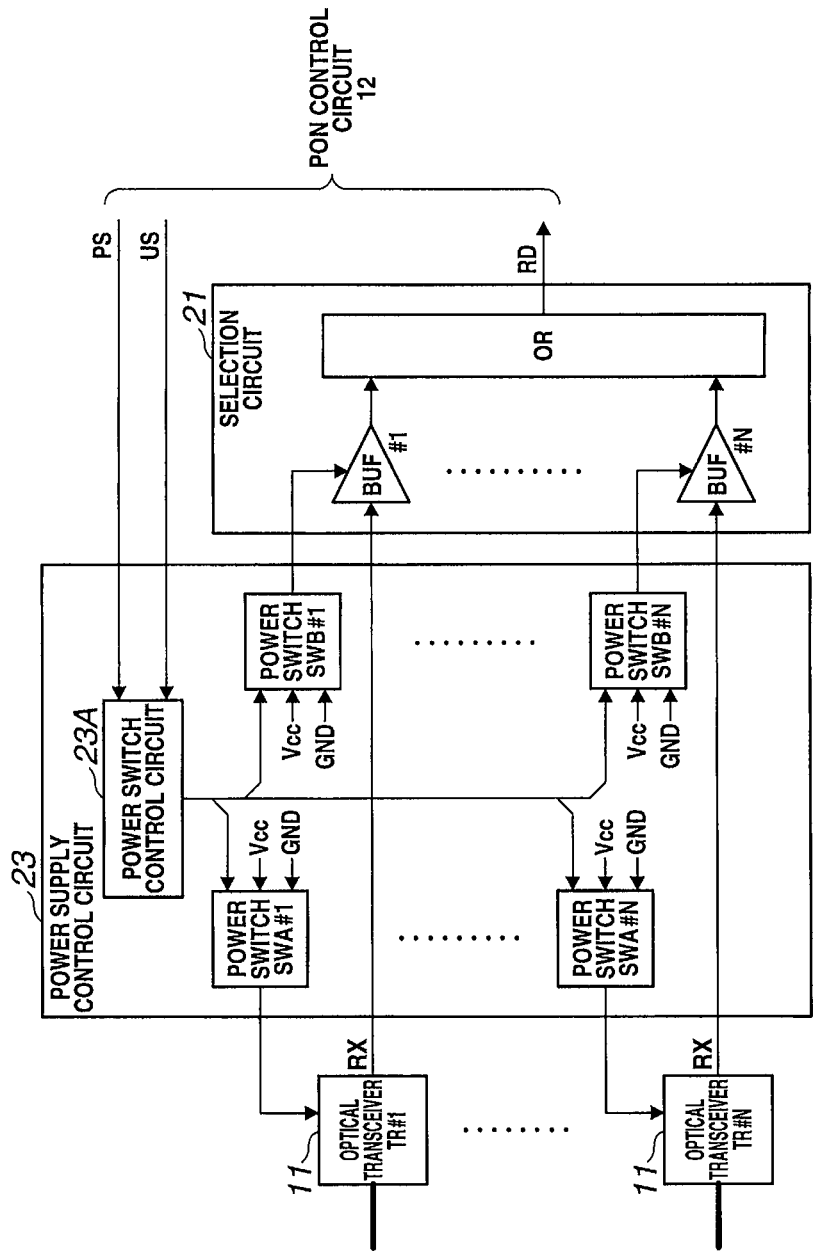
FIG. 3C is a block diagram showing an arrangement example of the selection circuit and a power supply control circuit according to the second embodiment.

FIG. 3C shows an arrangement example of the selection circuit and the power supply control circuit according to the second embodiment. FIG. 3C shows an arrangement example in which the power supply control circuit 23 is provided for the selection circuit 21 shown in FIG. 3A. Note that the distribution circuit 22 can be the same as the arrangement example shown in FIG. 3B.

The selection circuit 21 has a function of causing the N buffer circuits (BUF#1 to BUM) provided in correspondence with the respective optical transceivers 11 (TR#1 to TR#N) to amplify the signals of upstream frames opto-electrically converted by the optical transceivers 11 (TR#1 to TR#N) and output the signals and causing the OR circuit (OR) to generate the OR output of the signals of the upstream frames output from the buffer circuits (BUF#1 to BUM) and output the OR output to the PON control circuit 12.

The power supply control circuit 23 has a function of stopping power supply to the resting optical transceiver 11 set in a rest state in the optical transceivers 11 (TR#1 to TR#N) based on the operation status PS from the PON control circuit 12 set for each of the optical transceivers 11 (TR#1 to TR#N), and a function of stopping power supply to some or all of circuits in the selection circuit 21 used to transfer an upstream frame output from the resting optical transceiver 11.

As shown in FIG. 3C, the power supply control circuit 23 includes, as main circuit portions, first power switches (SWA#1 to SWA#N), second power switches (SWB#1 to SWB#N), and a power switch control circuit 23A.

The first power switches (SWA#1 to SWA#N) are provided in correspondence with the respective optical transceivers 11 (TR#1 to TR#N) and have a function of selectively supplying one of an operating potential Vcc and a ground potential GND to the corresponding optical transceivers 11 (TR#1 to TR#N) in accordance with an instruction from the power switch control circuit 23A.

The second power switches (SWB#1 to SWB#N) are provided in correspondence with the respective optical transceivers 11 (TR#1 to TR#N) and have a function of selectively supplying one of the operating potential Vcc and the ground potential GND to circuit portions, for example, the buffer circuits (BUF#1 to BUM) in the selection circuit 21 corresponding to the optical transceivers 11 (TR#1 to TR#N) in accordance with an instruction from the power switch control circuit 23A.

The power switch control circuit 23A has a function of, for an optical transceiver TR#i (i is an integer of 1 to N) whose operation status PS represents "operating" in the optical transceivers 11 (TR#1 to TR#N), instructing a corresponding first power switch (SWA#i) and second power switch (SWB#i) to supply power, and a function of, for an optical transceiver TR#j (j is an integer of 1 to N) whose operation status PS represents "rest", instructing a corresponding first power switch (SWA#j) and second power switch (SWB#j) to stop power supply.

The operation status PS is setting information representing the operation state of each of the optical transceivers 11 (TR#1 to TR#N), and is set in advance by an operator from an external device such as a PC connected to the OLT 1. Depending on the placement environment of the OLT 1, the number of ONUs 3 to be accommodated may be small, and the optical transceiver 11 that is not used for frame communication by the ONU 3 in the optical transceivers 11 (TR#1 to TR#N) may be generated. In this case, the operation status PS of the optical transceiver 11 used for frame communication by the ONU 3 is set to "use", and the operation status PS of the optical transceiver 11 not used for frame communication by the ONU 3 is set to "rest". The operation statuses PS are managed by the PON control circuit 12 and stored in its internal memory. However, the operation statuses PS may be managed and stored in another circuit portion such as the selection and distribution circuit 13 in the OLT 1.

On the other hand, each of the optical transceivers 11 (TR#1 to TR#N) has a function of performing an optical communication operation with the connected optical splitter 2 in a case of supply of the operating potential Vcc from a corresponding one of the first power switches (SWA#1 to SWA#N), and a function of stopping the optical communication operation in a case of supply of the ground potential GND from the corresponding one of the first power switches (SWA#1 to SWA#N).

In addition, each of the buffer circuits (BUF#1 to BUM) is formed from an amplification circuit such as an operational amplifier, and has a function of amplifying the signal of an upstream frame input from a corresponding one of the optical transceivers 11 (TR#1 to TR#N) and outputting the signal to the OR circuit (OR) in a case of supply of the operating potential Vcc from a corresponding one of the second power switches (SWB#1 to SWB#N), and a function of stopping the amplification operation and outputting the ground potential GND in a case of supply of the ground potential GND from the corresponding one of the second power switches (SWB#1 to SWB#N).

Hence, for the optical transceiver TR#j (j is an integer of 1 to N) of the optical transceivers 11 (TR#1 to TR#N), whose operation status PS represents "operating", the operating potential Vcc is supplied from the corresponding first power switch SWA#j to the optical transceiver TR#j, and the operating potential Vcc is supplied from the second power switch SWB#j to the buffer circuit BUF#j corresponding to the optical transceiver TR#j in accordance with an instruction from the power switch control circuit 23A.

For the optical transceiver TR#i of the optical transceivers 11 (TR#1 to TR#N), whose operation status PS represents "rest", the ground potential GND is supplied from the corresponding first power switch SWA#i to the optical transceiver TR#i, and the ground potential GND is supplied from the second power switch SWB#i to the buffer circuit BUF#i corresponding to the optical transceiver TR#i in accordance with an instruction from the power switch control circuit 23A. Accordingly, power supply to the optical transceiver 11 TR#i at rest and the buffer circuit BUF#i corresponding to it is stopped, and power consumption in these circuit portions is reduced.

A case in which power supply to each of the optical transceivers 11 (TR#1 to TR#N) and one of the buffer circuits (BUF#1 to BUM) corresponding to the optical transceiver 11 is controlled in accordance with the operation status PS of each of the optical transceivers 11 (TR#1 to TR#N) has been described above. Additionally, power supply to the buffer circuits (BUF#1 to BUM) may be controlled based on an upstream band allocation status US of time-division allocation to the ONUs 3.

The upstream band allocation status US is information generated by the PON control circuit 12 for each of the optical transceivers 11 (TR#1 to TR#N) based on the allocation status of the communication band for upstream frame transmission time-divisionally allocated to the ONUs 3 and representing the arrival time periods in which upstream frames time-divisionally arrive from each ONU 3 connected to the optical transceiver TR#i. The upstream band allocation status US is formed from, for example, an upstream frame arrival time Ts from each ONU 3 and an upstream frame length Tl, and is output for each of the optical transceivers 11 (TR#1 to TR#N).

In accordance with the period of arrival of an upstream frame at each of the optical transceivers 11 (TR#1 to TR#N) based on the upstream band allocation status US, the power switch control circuit 23A instructs the second power switch SWB#i corresponding to the optical transceiver 11 to supply power to the buffer circuit BUF#i corresponding to the optical transceiver TR#i.

Accordingly, during a period when an upstream frame arrives, the second power switch SWB#i supplies the operating potential Vcc to the buffer circuit BUF#i corresponding to the operating optical transceiver TR#i of the optical transceivers 11 (TR#1 to TR#N). During a period when no upstream frame arrives, the second power switch SWB#i stops supplying the operating potential Vcc to the buffer circuit BUF#i.

Hence, since supply of the operating potential Vcc is stopped for each of the buffer circuits (BUF#1 to BUM) at which no upstream frame arrives, wasteful power consumption is suppressed, and power consumption in the selection circuit 21 is reduced. Additionally, in place of the AND circuits (AND#1 to AND#N) shown in FIG. 3A, the buffer circuits (BUF#1 to BUM) mask (gating) the upstream frame outputs RX by the upstream band allocation status US.

[Arrangement Example 3 of Selection and Distribution Circuit]

Arrangement example 3 of the selection and distribution circuit 13 according to this embodiment will be described next with reference to FIG. 4.

An arrangement example using AND circuits and an OR circuit has been described concerning the selection circuit 21 shown in FIG. 3A. However, the selection circuit 21 can also be formed using selectors (SEL) in place of the AND circuits and the OR circuit.

Figure 4:
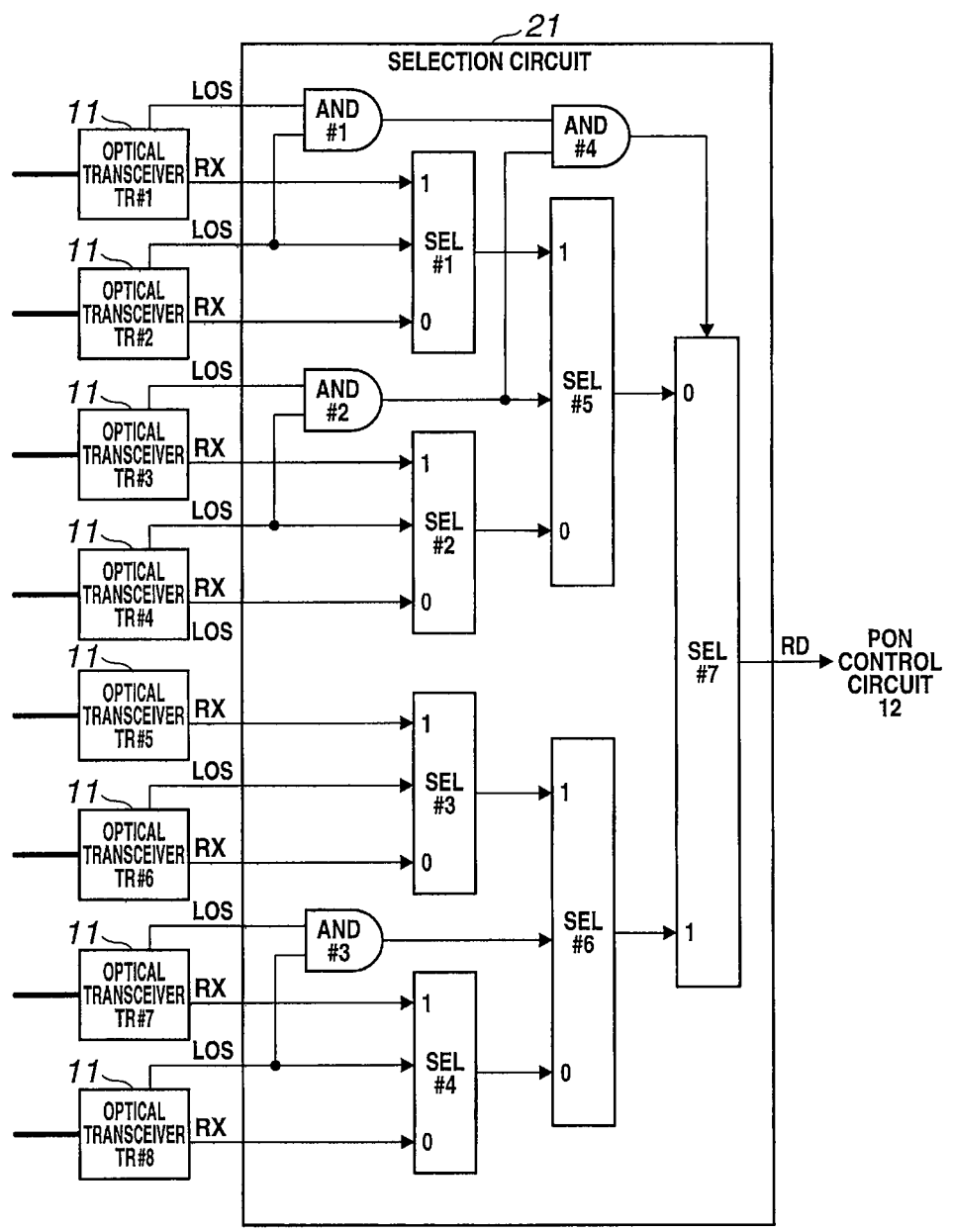
FIG. 4 is a block diagram showing an arrangement example of the selection circuit (selector) according to the second embodiment.

FIG. 4 shows an arrangement example of the selection circuit (selector) according to the second embodiment. An arrangement example of the selection circuit 21 using 2-input selectors (SEL) connected in multiple stages is illustrated here. Note that the distribution circuit 22 can be the same as the arrangement example shown in FIG. 3B.

The selection circuit 21 is predicated on a case in which eight optical transceivers 11 (TR#1 to TR#8) are provided in the OLT 1. Seven 2-input selectors (SEL#1 to SEL#7) each configured to selectively output one of the inputs are connected in three stages of a tree structure. AND circuits (AND#1 to AND#4) generate switching signals for the selectors SEL#5 to SEL#7 based on the LOS outputs from the optical transceivers 11 (TR#1 to TR#4 and TR#6 to TR#8).

Of the selectors (SEL#1 to SEL#7), the selectors (SEL#1 to SEL#4) of the lowermost stage receive upstream frames from the optical transceivers 11 (TR#1 to TR#8). The selectors (SEL#5 and SEL#6) of the next stage receive selective outputs from the selectors (SEL#1 to SEL#4) of the immediately preceding stage. The selector (SEL#7) of the uppermost stage selects one of the selective outputs from the two selectors (SEL#5 and SEL#6) of the immediately preceding stage, and outputs the selected output to the PON control circuit 12.

More specifically, the selectors SEL#1 to SEL#4 each of which receives two of the upstream frame outputs RX from the optical transceivers TR#1 to TR#8 are connected to the first stage. The selectors SEL#5 and SEL#6 each of which receives two of the selective outputs from the selectors SEL#1 to SEL#4 are connected to the second stage. The selector SEL#7 which receives the two selective outputs from the selectors SEL#5 and SEL#6 is connected to the third stage.

The LOS outputs from the optical transceivers TR#2, TR#4, TR#6, and TR#8 are input to the selectors SEL#1 to SEL#4 as switching signals. In addition, the AND output of the LOS outputs from the optical transceivers TR#3 and TR#4, which is output from the AND circuit AND#2, is input to the selector SEL#5 as a switching signal.

Additionally, the AND output of the LOS outputs from the optical transceivers TR#7 and TR#8, which is output from the AND circuit AND#3, is input to the selector SEL#6 as a switching signal. Furthermore, the AND output from the AND circuit AND#4 which receives the AND output of the LOS outputs from the optical transceivers TR#1 and TR#2, which is output from the AND circuit AND#1, and the AND output from the AND circuit AND#2 is input to the selector SEL#7 as a switching signal.

Since only one ONU 3 time-divisionally emits light (transmits an upstream frame) based on the above-described upstream band allocation of the PON control circuit 12, one of the LOS outputs from the optical transceivers TR#1 to TR#8 is "0", or all the LOS outputs are "1".

Hence, for example, if only the LOS output from the optical transceiver TR#5 is "0", the output from the transceiver TR#5 is output to the PON control circuit 12. If only the LOS output from the optical transceiver TR#4 is "0", each of the selectors SEL#2, SEL#5, and SEL#7 selectively outputs the input on the "0" side. Hence, the upstream frame output RX from the transceiver TR#4 passes through the selectors SEL#2, SEL#5, and SEL#7 and is output to the PON control circuit 12 as the upstream frame output RD.

Even for the remaining transceivers TR#1 to TR#3 and TR#6 to TR#8, if only the LOS output of one transceiver TR is "0", a corresponding one of the selectors SEL#1 to SEL#7 selectively outputs the input on the "0" side. The output of the transceiver TR whose LOS output is "0" is thus output to the PON control circuit 12.

On the other hand, if the LOS outputs of the transceivers TR#1 to TR#4 and TR#6 to TR#8 are "1", each of the selectors SEL#1 to SEL#7 selectively outputs the input on the "1" side. For this reason, the upstream frame output RX from the transceiver TR#5 passes through the selectors SEL#3, SEL#6, and SEL#7 and is output to the PON control circuit 12 as the upstream frame output RD. In this case, if an optical signal has not reached the transceiver TR#5, the upstream frame output RX is invalid data.

[Arrangement Example 4 of Selection and Distribution Circuit]

Arrangement example 4 of the selection and distribution circuit 13 according to this embodiment will be described next with reference to FIGS. 5A and 5B.

When applying the arrangement of the OLT 1 shown in FIG. 2 to a 10G-EPON system, the following points need to be taken into consideration. (1) The optical transceiver 11 for 10G-EPON sometimes has two outputs, that is, a 10-Gbit/s output and a 1-Gbit/s output. (2) When connecting both the ONU 3 for 10G-EPON and the ONU 3 for GE-PON system to the same OLT 1, the PON control circuit 12 needs to have two outputs, that is, a 10-Gbit/s output and a 1-Gbit/s output as the downstream frame outputs TD and output (distribute) both outputs to all the optical transceivers 11.

Figure 5A:
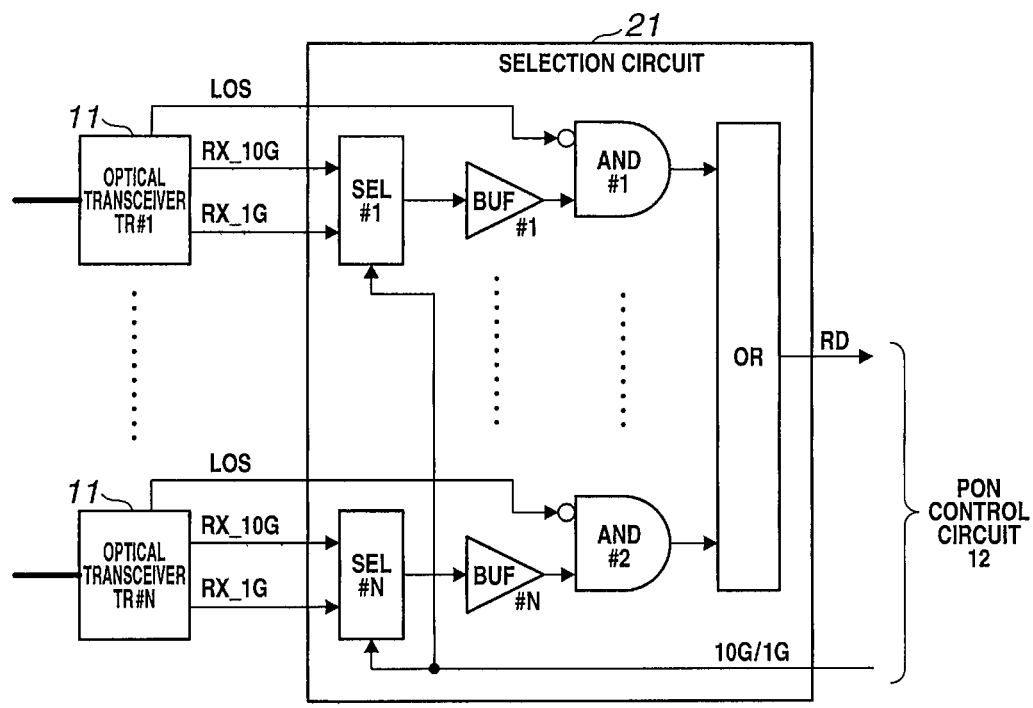
FIG. 5A is a block diagram showing an arrangement example of the selection circuit (10G/1G switching system) according to the second embodiment.

FIG. 5A shows an arrangement example of the selection circuit (10G/1G switching system) according to the second embodiment. An arrangement example in a case in which the selection circuit 21 shown in FIG. 3A is applied to a 10G-EPON system is illustrated here.

The selection circuit 21 includes, as main circuit portions, not only the AND circuits (AND#1 to AND#N), the buffer circuits (BUF#1 to BUM), and the N-input OR circuit (OR) shown in FIG. 3A but also N selectors (SEL#1 to SEL#N) corresponding to the N optical transceivers 11 (TR#1 to TR#N). Each of the selectors (SEL#1 to SEL#N) has a function of selecting one of an upstream frame output RX_10G for 10 Gbits/s and an upstream frame output RX_1G for 1 Gbit/s output from a corresponding one of the optical transceivers 11 (TR#1 to TR#N) based on a 10G/1G selection signal output from the PON control circuit 12 and outputting the selected upstream frame output to a corresponding one of the buffer circuits (BUF#1 to BUF#N).

In this case, each of the optical transceivers 11 (TR#1 to TR#N) of the OLT 1 includes a 10-Gbit/s output port and a 1-Gbit/s output port as upstream frame output ports, and a 10-Gbit/s input port and a 1-Gbit/s input port as downstream frame input ports. In addition, the LOS output is output in accordance with the presence/absence of an optical signal input from the optical splitter 2 without making a distinction between 10 Gbits/s and 1 Gbit/s.

The PON control circuit 12 of the OLT 1 includes an upstream frame input capable of coping with both a 10-Gbit/s input and a 1-Gbit/s input. The PON control circuit 12 includes a 10-Gbit/s output port and a 1-Gbit/s output port as downstream frame output ports. In addition, the PON control circuit 12 recognizes whether to permit frame transmission at 10 Gbits/s or frame transmission at 1 Gbit/s when allocating an upstream band to each ONU 3, and has a function of outputting the transmission rate setting output (10G/1G) to the selection and distribution circuit 13.

Accordingly, a 10-Gbit/s upstream frame transmitted from an ONU 3 is output from the 10-Gbit/s output port of a corresponding one of the optical transceivers 11 (TR#1 to TR#N), output to a corresponding one of the buffer circuits (BUF#1 to BUF#N) via a corresponding one of the selectors (SEL#1 to SEL#N), and output to the PON control circuit 12 via a corresponding one of the AND circuits (AND#1 to AND#N) and the OR circuit (OR). In addition, a 1-Gbit/s upstream frame transmitted from the ONU 3 is output from the 1-Gbit/s output port of the corresponding one of the optical transceivers 11 (TR#1 to TR#N), output to the corresponding one of the buffer circuits (BUF#1 to BUF#N) via the corresponding one of the selectors (SEL#1 to SEL#N), and output to the PON control circuit 12 via the corresponding one of the AND circuits (AND#1 to AND#N) and the OR circuit (OR).

Figure 5B:
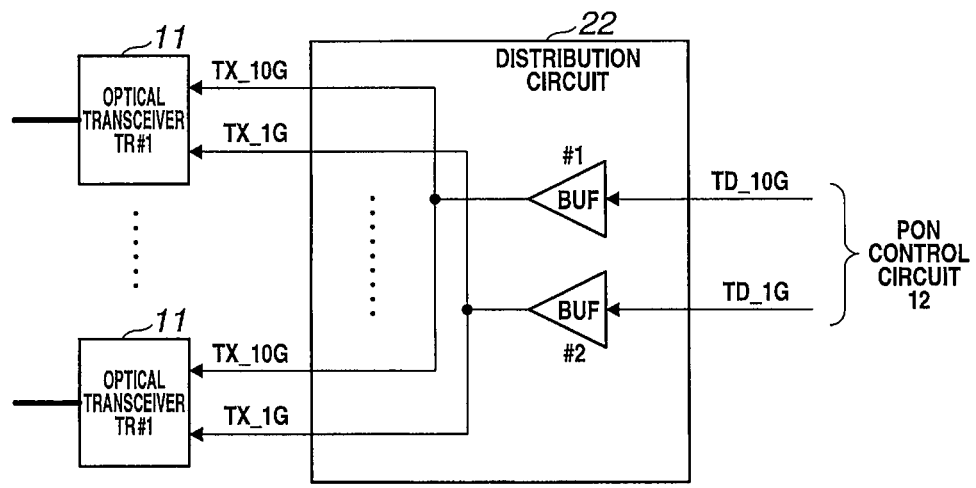
FIG. 5B is a block diagram showing an arrangement example of the distribution circuit (10G/1G switching system) according to the second embodiment.

FIG. 5B shows an arrangement example of the distribution circuit (10G/1G switching system) according to the second embodiment. An arrangement example in a case in which the distribution circuit 22 shown in FIG. 5B is applied to a 10G-EPON system is illustrated here.

The distribution circuit 22 includes, as main circuit portions, a buffer circuit BUF#1 configured to distribute a 10-Gbit/s downstream frame output TD 10G output from the PON control circuit 12 as 10-Gbit/s downstream frame outputs TX_10G to the N optical transceivers 11 (TR#1 to TR#N) in parallel, and a buffer circuit BUF#2 configured to distribute a 1-Gbit/s downstream frame output TD_1G output from the PON control circuit 12 as 1-Gbit/s downstream frame outputs TX_1G to the N optical transceivers 11 (TR#1 to TR#N) in parallel.

Accordingly, the downstream frame output TD_10G output from the 10-Gbit/s output port of the PON control circuit 12 is distributed from the buffer circuit BUF#1 as the downstream frame outputs TX_10G to the 10-Gbit/s input ports of the optical transceivers TR#1 to TR#N in parallel. In addition, the downstream frame output TD_1G output from the 1-Gbit/s output port of the PON control circuit 12 is distributed from the buffer circuit BUF#2 as the downstream frame outputs TX_1G to the 1-Gbit/s input ports of the optical transceivers TR#1 to TR#N in parallel.

[Arrangement Example 5 of Selection and Distribution Circuit]

Arrangement example 5 of the selection and distribution circuit 13 according to this embodiment will be described next with reference to FIG. 6.

When applying the arrangement of the OLT 1 shown in FIG. 2 to a 10G-EPON system, as the selection circuit 21, two independent selection circuits 21 for 10 Gbits/s and 1 Gbit/s each formed from the selection circuit 21 shown in FIG. 3A described above may be provided in parallel in place of the arrangement example shown in FIGS. 5A and 5B described above.

Figure 6:
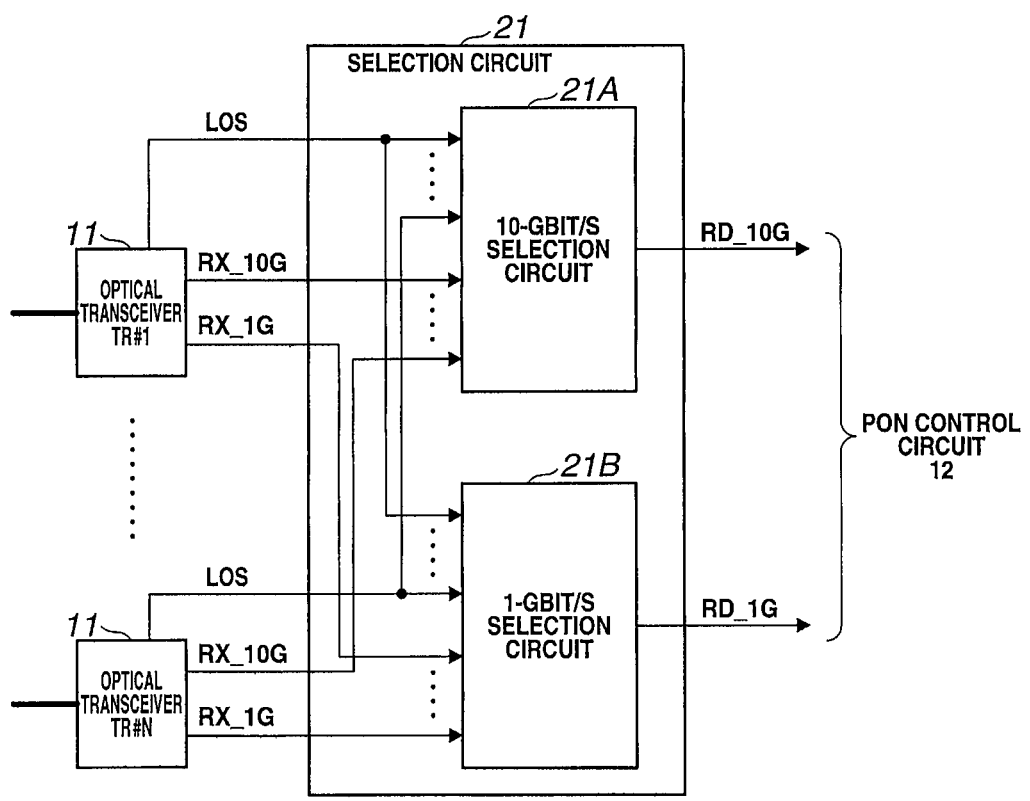
FIG. 6 is a block diagram showing an arrangement example of the selection circuit (10G/1G parallel system) according to the second embodiment.

FIG. 6 shows an arrangement example of the selection circuit (10G/1G parallel system) according to the second embodiment. Here, a 10-Gbit/s selection circuit 21A formed from the selection circuit 21 shown in FIG. 3A described above and a 1-Gbit/s selection circuit 21B formed from the selection circuit 21 shown in FIG. 3A described above are provided in parallel. Note that the distribution circuit 22 can be the same as the arrangement example shown in FIG. 5B.

The 10-Gbit/s selection circuit 21A has a function of selecting one of the 10-Gbit/s upstream frame outputs RX output from the optical transceivers 11 (TR#1 to TR#N) and outputting the selected upstream frame output to the PON control circuit 12. The 1-Gbit/s selection circuit 21B has a function of selecting one of the 1-Gbit/s upstream frame outputs RX output from the optical transceivers 11 (TR#1 to TR#N) and outputting the selected upstream frame output to the PON control circuit 12.

In this case, each of the optical transceivers 11 (TR#1 to TR#N) of the OLT 1 includes a 10-Gbit/s output port and a 1-Gbit/s output port as upstream frame output ports, and a 10-Gbit/s input port and a 1-Gbit/s input port as downstream frame input ports. In addition, the LOS output is output in accordance with the presence/absence of an optical signal input from the optical splitter 2 without making a distinction between 10 Gbits/s and 1 Gbit/s.

The PON control circuit 12 of the OLT 1 includes upstream frame inputs capable of coping with both a 10-Gbit/s input and a 1-Gbit/s input. The PON control circuit 12 includes a 10-Gbit/s output port and a 1-Gbit/s output port as downstream frame output ports, and a 10-Gbit/s input port and a 1-Gbit/s input as upstream frame input ports. In addition, the PON control circuit 12 recognizes whether to permit frame transmission at 10 Gbits/s or frame transmission at 1 Gbit/s when allocating an upstream band to each ONU 3, and has a function of outputting the transmission rate setting output (10G/1G) of a frame to the selection and distribution circuit 13.

Accordingly, 10-Gbit/s upstream frames transmitted from the ONUs 3 are output from the 10-Gbit/s output ports of the optical transceivers TR#1 to TR#N, input to the 10-Gbit/s selection circuit 21A, selected based on the LOS outputs from the optical transceivers TR#1 to TR#N, and input to the 10-Gbit/s input port of the PON control circuit 12. In addition, 1-Gbit/s upstream frames transmitted from the ONUs 3 are output from the 1-Gbit/s output ports of the optical transceivers TR#1 to TR#N, input to the 1-Gbit/s selection circuit 21B, selected based on the LOS outputs from the optical transceivers TR#1 to TR#N, and input to the 1-Gbit/s input port of the PON control circuit 12.

Effects of Second Embodiment

As described above, in this embodiment, the selection and distribution circuit 13 is provided between the N optical transceivers 11 and one PON control circuit 12. The selection and distribution circuit 13 selects the optical transceiver 11 corresponding to an upstream frame that time-divisionally arrives, thereby transferring the upstream frame optoelectrically converted by the transceiver 11 to the PON control circuit 12. The selection and distribution circuit 13 also distributes a downstream frame from the PON control circuit 12 to each optical transceiver 11. The power supply control circuit 23 stops power supply to the resting optical transceiver 11 set in a rest state in the optical transceivers 11 based on the operation status PS of the optical transceiver 11, which is set for each optical transceiver 11, and stop power supply to some or all of circuits in the selection and distribution circuit 13 used to transfer an upstream frame output from the resting optical transceiver 11.

Accordingly, in the OLT 1, N×32 ONUs 3 are accommodated at maximum, and power supply to the resting optical transceiver 11 and some or all of circuits used to transfer an upstream frame output from the resting optical transceiver 11 is stopped.

It is therefore possible to reduce the device cost per ONU in the optical transmission system 100 and also reduce the operation cost by reducing power consumption in the OLT 1. As a result, the system cost per ONU in the optical transmission system, including the device cost and the operation cost, can be reduced.

The system cost per ONU in the optical transmission system 100 using the OLT 1 according to the above-described second embodiment is compared with that of the conventional PON system shown in FIG. 18.

As compared to the arrangement of the OLT in the conventional PON system using N PON control circuits, although the selection and distribution circuit 13 is added, the number of PON control circuits 12 is smaller in the arrangement of the OLT 1 according to this embodiment.

The device cost (the prices of necessary parts and an increase in the board price caused by an increase in the board area caused by an increase in the number of parts) of the selection and distribution circuit 13 is compared with the device cost of the PON control circuit 12. Since the cost of the selection and distribution circuit 13 is lower than the device cost of the PON control circuit 12, the device cost is lower in the arrangement of the OLT 1 according to this embodiment. Particularly, when the arrangement shown in FIGS. 3A to 3C is used, inexpensive small parts can be used. Hence, the device cost can further be reduced.

In the 10G-EPON system, the price of the PON control circuit 12 is assumed to be higher than that of the PON control circuit 12 for GE-PON. Hence, from the viewpoint of device cost, the selection and distribution circuit 13 attains superiority.

Furthermore, along with reduction of the circuit scale, power consumed by a circuit is also reduced. In the conventional OLT arrangement, even a circuit portion that is not used for frame transfer wastefully consumes power. However, according to the OLT 1 of this embodiment, power consumption in some or all circuit portions that are not used at the time of frame transfer is also reduced. Hence, the operation cost is lower in the arrangement of the OLT 1 according to this embodiment.

Accordingly, when the arrangement of the OLT 1 of this embodiment is employed, the system cost per ONU can be made lower than that of the conventional PON system.

Third Embodiment

Figure 7:
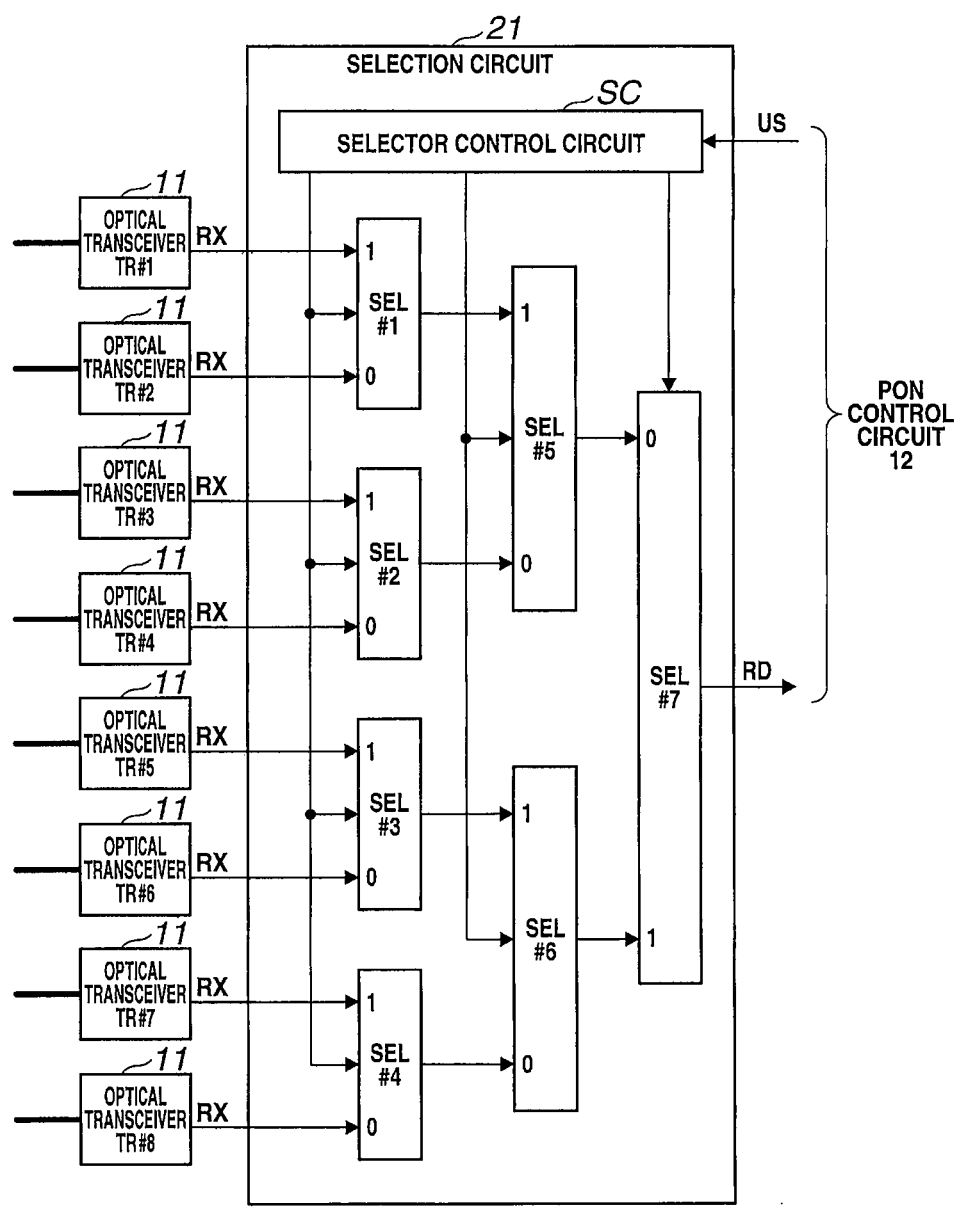
FIG. 7 is a block diagram showing an arrangement example of a selection circuit according to the third embodiment.

An OLT 1 according to the third embodiment of the present invention will be described next with reference to FIG. 7. FIG. 7 shows an arrangement example of a selection circuit according to the third embodiment.

This arrangement is different from the arrangement shown in FIG. 4 described above in that selectors (SEL#1 to SEL#7) are controlled using not the LOS outputs of optical transceivers 11 but an upstream band allocation status US from a PON control circuit 12. For this reason, a selection circuit 21 of a selection and distribution circuit 13 is provided with a selector control circuit SC that controls the operations of the selectors SEL#1 to SEL#7. The rest of the arrangement of the OLT 1 according to this embodiment is the same as in the second embodiment.

The PON control circuit 12 performs upstream band allocation (frame transmission permission) for each ONU 3. Hence, if which optical transceiver 11 is connected to the ONU 3 can be known, the operations of the selectors SEL#1 to SEL#7 can be controlled such that the signal from the ONU 3 permitted to do frame transmission is output to the PON control circuit 12.

For example, when placing the ONUs 3, the correspondence between the individual ID (a MAC address or another serial number) of each ONU 3 and the optical transceiver 11 connected to the ONU 3 can be set for the selector control circuit SC.

As another method of setting which optical transceiver 11 is connected to the ONU 3, the following method is also usable. (1) The selectors SEL#1 to SEL#7 are set such that only an input from one specific optical transceiver 11 is output to the PON control circuit 12 in a period (discovery window) to permit transmission of a register request frame. (2) The MAC address of the ONU 3 that has transmitted the register request frame during the period of the setting is associated with the ID of the specific optical transceiver 11. (3) When the settings of the selectors SEL#1 to SEL#7 in the period (discovery window) to permit transmission of a register request frame is periodically changed, reception of register request frames from the ONUs 3 connected to all optical transceivers 11 and the MAC addresses of the ONUs 3 can be associated with the IDs of the connected optical transceivers 11.

In the selection circuit 21, the selector control circuit SC has a function of controlling the operations of the selectors SEL#1 to SEL#7 based on the upstream band allocation status US from the PON control circuit 12 in accordance with the setting of the connection relationship between the ONUs 3 and the optical transceivers 11 and selectively outputting, to the PON control circuit 12, an upstream frame output RX of one optical transceiver 11 from the optical transceivers TR#1 to TR#8.

The upstream band allocation status US is information generated by the PON control circuit 12 for each of the optical transceivers 11 (TR#1 to TR#N) based on the allocation status of the communication band for upstream frame transmission time-divisionally allocated to the ONUs 3 and representing the arrival time periods in which upstream frames time-divisionally arrives from each ONU 3 connected to the optical transceiver 11. The upstream band allocation status US is formed from, for example, an upstream frame arrival time from each ONU 3 and an upstream frame length, and is output for each of the optical transceivers 11 (TR#1 to TR#N).

In this embodiment as well, if the same optical transceivers as in the conventional PON system are used as the optical transceivers 11, communication with "N×32" ONUs 3 is possible at maximum, as in the first embodiment. For example, if N=4, communication with 128 ONUs 3 is possible at maximum. If N=16, communication with 512 ONUs 3 is possible at maximum.

The arrangement of this embodiment can also be applied to a 10G-EPON system. As for the system cost per ONU, the arrangement of the third embodiment is the same as the arrangement of the first embodiment, and the cost is lower than that of the conventional arrangement.

Fourth Embodiment

An OLT 1 according to the fourth embodiment of the present invention will be described next with reference to FIGS. 8, 9A, and 9B.

Figure 8:
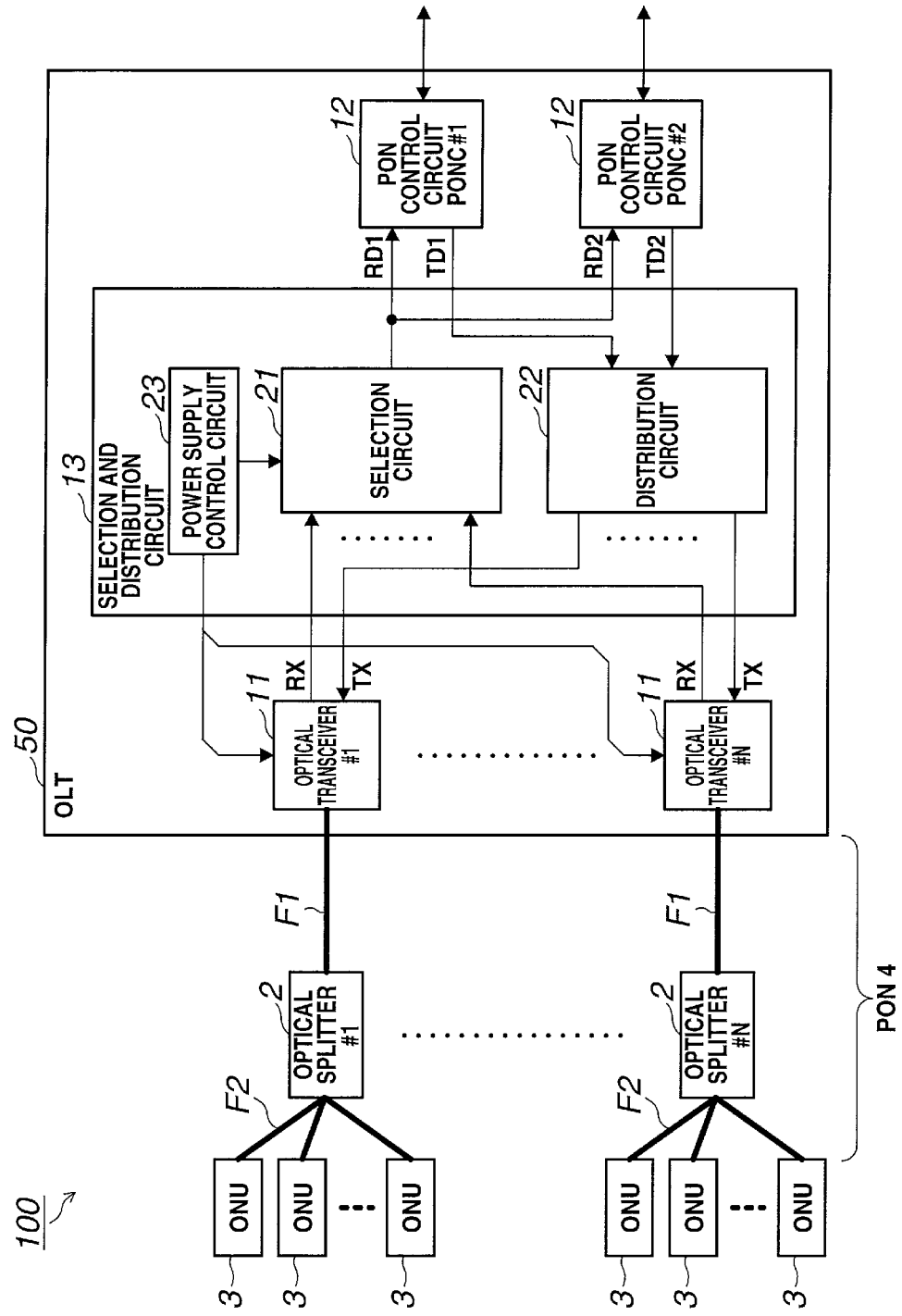
FIG. 8 is a block diagram showing the arrangement of an optical transmission system and an OLT according to the fourth embodiment.

FIG. 8 is a block diagram showing the arrangement of an optical transmission system and an OLT according to the fourth embodiment. This arrangement is different from the arrangement shown in FIG. 2 in that two PON control circuits 12 are connected to a selection and distribution circuit 13. In this example, a PON control circuit PONC#1 is provided as the PON control circuit 12 for operation, and a PON control circuit PONC#2 is provided as the reserve PON control circuit 12.

Figure 9A:
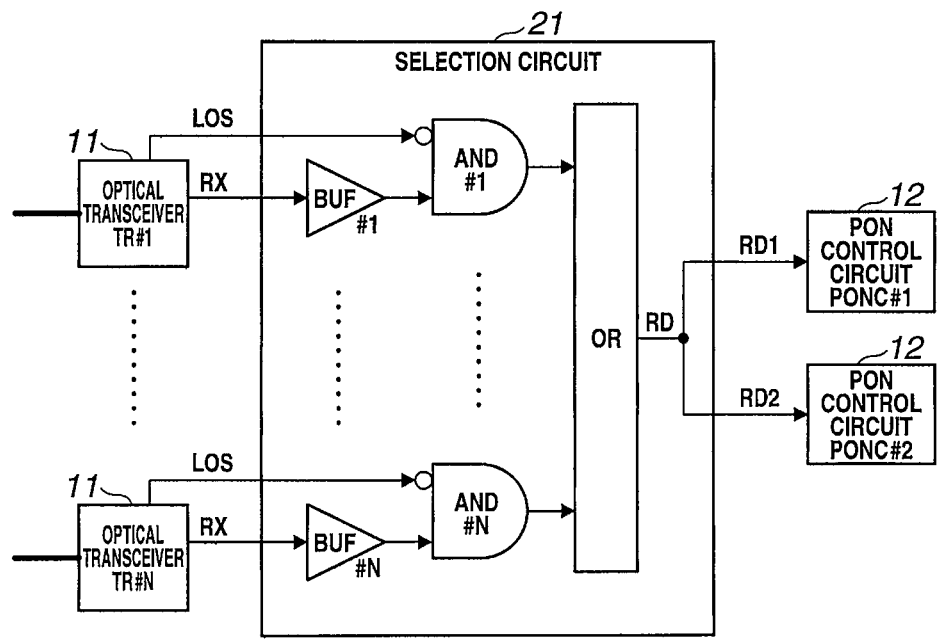
FIG. 9A is a block diagram showing an arrangement example of a selection circuit according to the fourth embodiment.

FIG. 9A shows an arrangement example of a selection circuit according to the fourth embodiment. FIG. 9B shows an arrangement example of a distribution circuit according to the fourth embodiment. The arrangements are different from the arrangements shown in FIGS. 3A and 3B in that one upstream frame output RD output from an OR circuit (OR) is distributed as upstream frame outputs RD (RD1 and RD2) to the two PON control circuits 12 (PONC#1 and PONC#2), and the distribution circuit includes a selector SEL configured to select one of downstream frame outputs TD1 and TD2 from the two PON control circuits 12 (PONC#1 and PONC#2) as a downstream frame output TD to the optical transceivers 11 (TR#1 to TR#N), and a selector control circuit SC configured to control the operation of the selector SEL in accordance with operation statuses ST1 and ST2 from the PON control circuits 12 (PONC#1 and PONC#2). The rest of the arrangement of the OLT 1 according to this embodiment is the same as in the second embodiment.

The OLT 1 according to this embodiment includes the two PON control circuits 12 (PONC#1 and PONC#2), and one of them is used as a reverse. In this example, the PON control circuit PONC#2 is the reserve.

Accordingly, the PON control circuit PONC#1 notifies the selector control circuit SC by the operation status ST1 that the PON control circuit is operating. The reserve PON control circuit PONC#2 notifies the selector control circuit SC by the operation status ST2 that the PON control circuit is standing by.

The selector control circuit SC controls the operation of the selector SEL to select the downstream frame output TD1 from the PON control circuit PONC#1 in the operating state. The downstream frame output TD1 of the PON control circuit PONC#1 selected by the selector SEL is thus distributed to the optical transceivers 11 (TR#1 to TR#N).

If a fault occurs in the PON control circuit PONC#1 in this state, the PON control circuit PONC#1 notifies the selector control circuit SC by the operation status ST1 that a fault has occurred, and instructs the PON control circuit PONC#2 by an operation status ST3 to change from the standby state to the operating state. Upon receiving the instruction to change to the operating state by the operation status ST3 from the PON control circuit PONC#1, the PON control circuit PONC#2 notifies the selector control circuit SC by the operation status ST2 that it is changed from the standby state to the operating state.

After confirming by the operation status ST2 that the PON control circuit PONC#2 is changed to the operating state, the selector control circuit SC controls the operation of the selector SEL to select the downstream frame output TD2 from the PON control circuit PONC#2 changed to the operating state. The downstream frame output TD2 of the PON control circuit PONC#2 selected by the selector SEL is thus distributed to the optical transceivers TR#1 to TR#N.

In the OLT 1 according to this embodiment, switching from the operating PON control circuit PONC#1 to the reserve PON control circuit PONC#2 is performed in this way. Hence, when the system is configured to allow exchange of the board with the PON control circuit PONC#1 during the operation of the PON control circuit PONC#2, a period to stop communication due to a fault in the PON control circuit PONC#1 or the like can be made as short as possible.

Additionally, the OLT 1 according to this embodiment has the same effects as the OLT 1 according to the second embodiment because the basic arrangement of the OLT 1 is the same as that of the OLT 1 according to the second embodiment.

Fifth Embodiment

Figure 10:
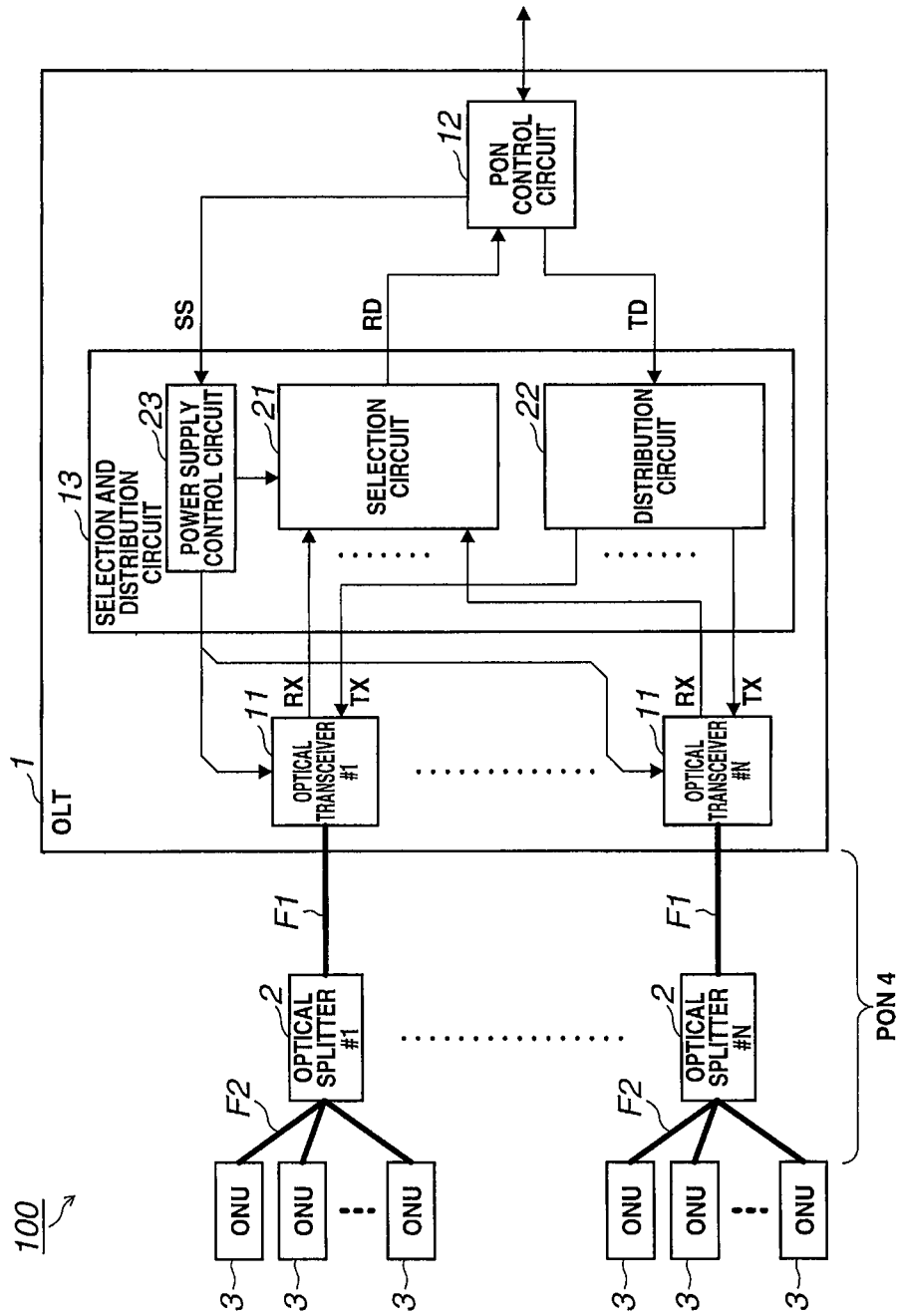
FIG. 10 is a block diagram showing the arrangement of an optical transmission system and an OLT according to the fifth embodiment.

An optical transmission system 100 and an OLT (station-side device) 1 according to the fifth embodiment of the present invention will be described next with reference to FIG. 10. FIG. 10 is a block diagram showing the arrangement of the optical transmission system and the OLT according to the fifth embodiment.

In this embodiment, as a detailed example of power supply control in the above-described first embodiment, a power supply control circuit 23 stops power supply to, of optical transceivers 11, a sleeping optical transceiver 11 connected to ONUs 3 all of which are connected to the optical transceiver 11 and are in a sleep state based on an optical transceiver specific sleep status for each optical transceiver 11, which is extracted from a sleep status SS of the ONU 3 set for each ONU 3.

[Arrangement Example of Selection Circuit and Power Supply Control Circuit]

An arrangement example of a selection circuit 21 and the power supply control circuit 23 according to this embodiment will be described with reference to FIG. 11.

When the power supply control circuit 23 is provided for the selection circuit 21 shown in FIG. 3A described above, power supply to circuit portions corresponding to the optical transceivers 11 (TR#1 to TR#N) at which no upstream frame has arrived can be stopped, and power consumption can be reduced.

Figure 11:
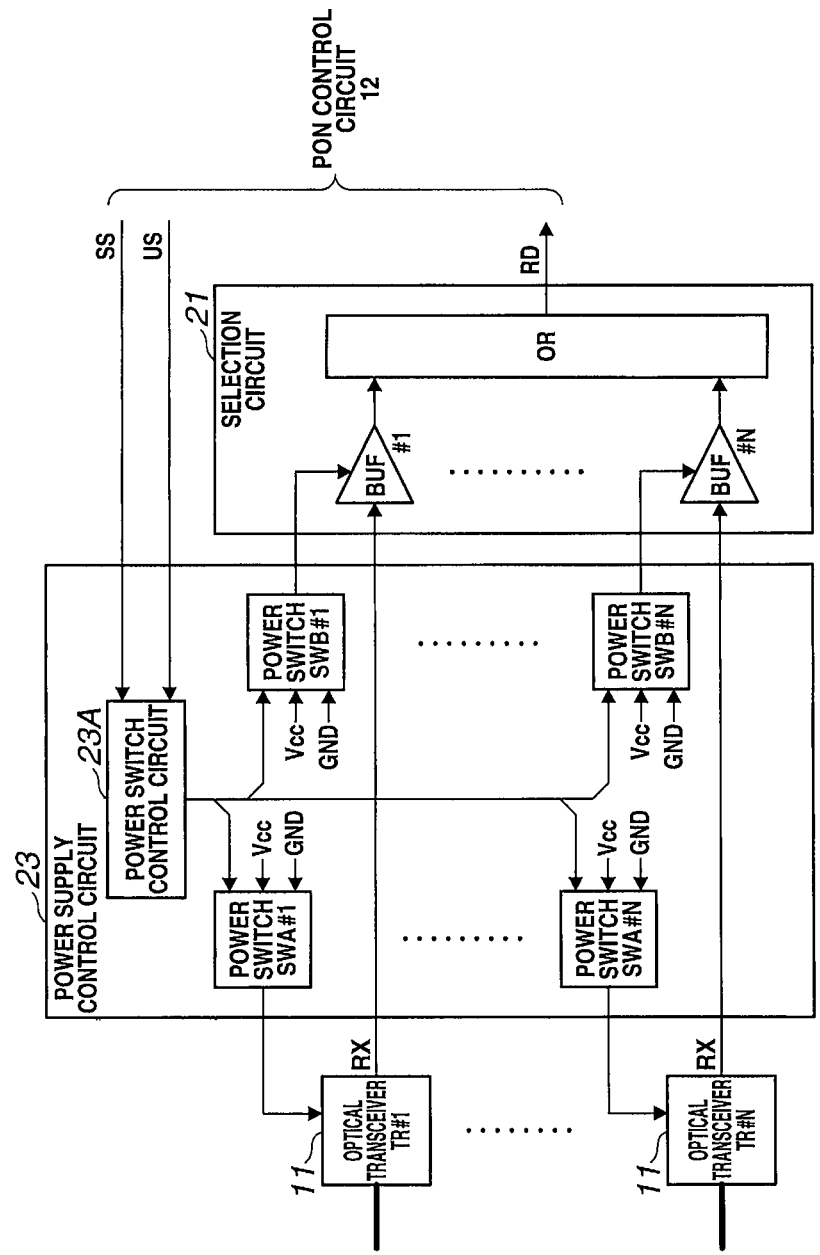
FIG. 11 is a block diagram showing an arrangement example of a selection circuit and a power supply control circuit according to the fifth embodiment.

FIG. 11 shows an arrangement example of the selection circuit and the power supply control circuit according to the fifth embodiment. An arrangement example in which the power supply control circuit 23 is provided for the selection circuit 21 shown in FIG. 3A is illustrated. Note that a distribution circuit 22 can be the same as the arrangement example shown in FIG. 3B.

The selection circuit 21 has a function of causing N buffer circuits (BUF#1 to BUF#N) provided in correspondence with the respective optical transceivers 11 (TR#1 to TR#N) to amplify the signals of upstream frames opto-electrically converted by the optical transceivers 11 (TR#1 to TR#N) and output the signals and causing an OR circuit (OR) to generate the OR output of the signals of the upstream frames output from the buffer circuits (BUF#1 to BUF#N) and output the OR output to a PON control circuit 12.

The power supply control circuit 23 has a function of extracting the optical transceiver specific sleep status for each of the optical transceivers 11 (TR#1 to TR#N) from the sleep status SS 12 set for each ONU 3 and output from the PON control circuit, a function of stopping power supply to a sleeping optical transceiver TR#i (i is an integer of 1 to N) connected to the ONUs 3 all of which are connected to the optical transceivers 11 (TR#1 to TR#N) of the optical transceivers 11 (TR#1 to TR#N) and are in a sleep state based on the optical transceiver specific sleep status, and a function of stopping power supply to some or all of circuits in the selection circuit 21 used to transfer an upstream frame output from the sleeping optical transceiver TR#i.

As shown in FIG. 11, the power supply control circuit 23 includes, as main circuit portions, first power switches (SWA#1 to SWA#N), second power switches (SWB#1 to SWB#N), and a power switch control circuit 23A.

The first power switches (SWA#1 to SWA#N) are provided in correspondence with the respective optical transceivers 11 (TR#1 to TR#N) and have a function of selectively supplying one of an operating potential Vcc and a ground potential GND to the corresponding optical transceivers 11 (TR#1 to TR#N) in accordance with an instruction from the power switch control circuit 23A.

The second power switches (SWB#1 to SWB#N) are provided in correspondence with the respective optical transceivers 11 (TR#1 to TR#N) and have a function of selectively supplying one of the operating potential Vcc and the ground potential GND to circuit portions, for example, buffer circuits (BUF#1 to BUF#N) in the selection circuit 21 corresponding to the optical transceivers 11 (TR#1 to TR#N) in accordance with an instruction from the power switch control circuit 23A.

The power switch control circuit 23A has a function of, for each optical transceiver of the optical transceivers 11 (TR#1 to TR#N) other than the sleeping optical transceiver TR#i, instructing a corresponding first power switch (SWA#i) and second power switch (SWB#i) to supply power, and a function of, for the sleeping optical transceiver TR#i, instructing a corresponding first power switch (SWA#j) and second power switch (SWB#j) to stop power supply.

On the other hand, each of the optical transceivers 11 (TR#1 to TR#N) has a function of performing an optical communication operation with a connected optical splitter 2 in a case of supply of the operating potential Vcc from a corresponding one of the first power switches (SWA#1 to SWA#N), and a function of stopping the optical communication operation in a case of supply of the ground potential GND from the corresponding one of the first power switches (SWA#1 to SWA#N).

In addition, each of the buffer circuits (BUF#1 to BUF#N) is formed from an amplification circuit such as an operational amplifier, and has a function of amplifying the signal of an upstream frame input from a corresponding one of the optical transceivers 11 (TR#1 to TR#N) and outputting the signal to the OR circuit (OR) in a case of supply of the operating potential Vcc from a corresponding one of the second power switches (SWB#1 to SWB#N), and a function of stopping the amplification operation and outputting the ground potential GND in a case of supply of the ground potential GND from the corresponding one of the second power switches (SWB#1 to SWB#N).

The optical transmission system 100 may be provided with a function of, for the ONU 3 that does not hold data to be transmitted to the OLT 1 in the ONUs 3, causing the PON control circuit 12 to assign an arbitrary sleep period to the ONU 3 and causing the OLT 1 to instruct the ONU 3 to shift to a power saving state, that is, a sleep state in the sleep period. The sleep status SS is information representing the sleep period assigned to each ONU 3, and is formed from, for example, the start time and length of the sleep period.

The sleep period of each ONU 3 is thus assigned depending on the upstream data holding status or the like in the ONU 3. However, the sleep periods of the ONUs 3 connected to one of the optical transceivers 11 (TR#1 to TR#N) may overlap, and all the ONUs 3 may be in the sleep state only during the sleep overlap period. In this case, frame communication is not substantially performed between the optical transceiver 11 and the corresponding optical splitter 2.

In this embodiment, placing focus on such a sleep overlap period, power supply is stopped only during the sleep overlap period for the sleeping optical transceiver TR#i of the optical transceivers 11 (TR#1 to TR#N), which is connected to the ONUs 3 all of which are in the sleep state, based on the optical transceiver specific sleep status extracted from the sleep status SS of each ONU 3.

Hence, based on the optical transceiver specific sleep status, for the sleeping optical transceiver TR#i of the optical transceivers 11 (TR#1 to TR#N), which is connected to the ONUs 3 all of which are in the sleep state, the corresponding first power switch SWA#i supplies the ground potential GND to the optical transceiver TR#i, and the corresponding second power switch SWB#i supplies the ground potential GND to the buffer circuit BUF#i corresponding to the optical transceiver TR#i in accordance with an instruction synchronous with the sleep overlap period from the power switch control circuit 23A. Accordingly, power supply to the optical transceiver TR#i in a sleep state and the buffer circuit BUF#i corresponding to that is stopped, and power consumption in these circuit portions is reduced.

For the optical transceiver TR#j (j is an integer other than i of 1 to N) other than the sleeping optical transceiver TR#i, the corresponding first power switch SWA#j supplies the operating potential Vcc to the optical transceiver TR#j, and the corresponding second power switch SWB#j supplies the ground potential GND to the buffer circuit BUF#j corresponding to the optical transceiver TR#j in accordance with an instruction from the power switch control circuit 23A.

Note that a case in which the operation of extracting the optical transceiver specific sleep status of each of the optical transceivers 11 (TR#1 to TR#N) from the sleep status SS from the PON control circuit 12 set for each ONU 3 is executed by the power supply control circuit 23 has been described above as an example. However, the present invention is not limited to this. For example, the PON control circuit 12 may extract the optical transceiver specific sleep status and specify the sleeping optical transceiver TR#i connected to the ONUs 3 all of which are in the sleep state and the sleep overlap period, and the power supply control circuit 23 may stop power supply to the optical transceiver TR#i based on power supply stop information representing the optical transceiver TR#i and the sleep overlap period notified from the PON control circuit 12.

Additionally, a case in which power supply to the optical transceivers 11 (TR#1 to TR#N) and the corresponding buffer circuits (BUF#1 to BUF#N) is controlled in accordance with the optical transceiver specific sleep status of each of the optical transceivers 11 (TR#1 to TR#N) has been described above. In addition to this, power supply to the buffer circuits (BUF#1 to BUF#N) may be controlled based on the upstream band allocation status US of time-division allocation to the ONUs 3.

The upstream band allocation status US is information representing the arrival time periods in which upstream frames time-divisionally arrive from each ONU 3 connected to the optical transceiver TR#k (k is an integer of 1 to N), and generated by the PON control circuit 12 for each of the optical transceivers 11 (TR#1 to TR#N) based on the allocation status of an upstream frame transmission communication band time-divisionally allocated to each ONU 3. The upstream band allocation status US is formed from, for example, an upstream frame arrival time Ts from each ONU 3 and an upstream frame length Tl, and is output for each of the optical transceivers 11 (TR#1 to TR#N).

In accordance with the period of arrival of an upstream frame at each of the optical transceivers 11 (TR#1 to TR#N) based on the upstream band allocation status US, the power switch control circuit 23A instructs the second power switch SWB#k corresponding to the optical transceiver 11 to supply power to the buffer circuit BUF#k corresponding to the optical transceiver TR#k.

Accordingly, during a period when an upstream frame arrives, the second power switch SWB#k supplies the operating potential Vcc to the buffer circuit BUF#k corresponding to the operating optical transceiver TR#k of the optical transceivers 11 (TR#1 to TR#N). During a period when no upstream frame arrives, the second power switch SWB#k stops supplying the operating potential Vcc to the buffer circuit BUF#k.

Hence, since supply of the operating potential Vcc is stopped for each of the buffer circuits (BUF#1 to BUF#N) at which no upstream frame arrives, wasteful power consumption is suppressed, and power consumption in the selection circuit 21 is reduced. Additionally, in place of the AND circuits (AND#1 to AND#N) shown in FIG. 3A, the buffer circuits (BUF#1 to BUF#N) mask (gating) the upstream frame outputs RX by the upstream band allocation status US.

Note that the selection circuit 21 shown in FIG. 10 according to this embodiment is not limited to the arrangement example shown in FIG. 11, and the selection circuit 21 shown in FIG. 3A or 4 described above may be applied, as in the second embodiment. Alternatively, the selection circuit 21 shown in FIG. 7 may be applied, as in the third embodiment.

When the selection and distribution circuit 13 shown in FIG. 10 according to this embodiment is applied to a 10G-EPON system, the selection circuit 21 and the distribution circuit 22 shown in FIGS. 5A and 5B described above may be applied, as in the second embodiment. Alternatively, the selection circuit 21 shown in FIG. 6 described above may be applied in place of the selection circuit 21 shown in FIG. 5A.

Figure 9B:
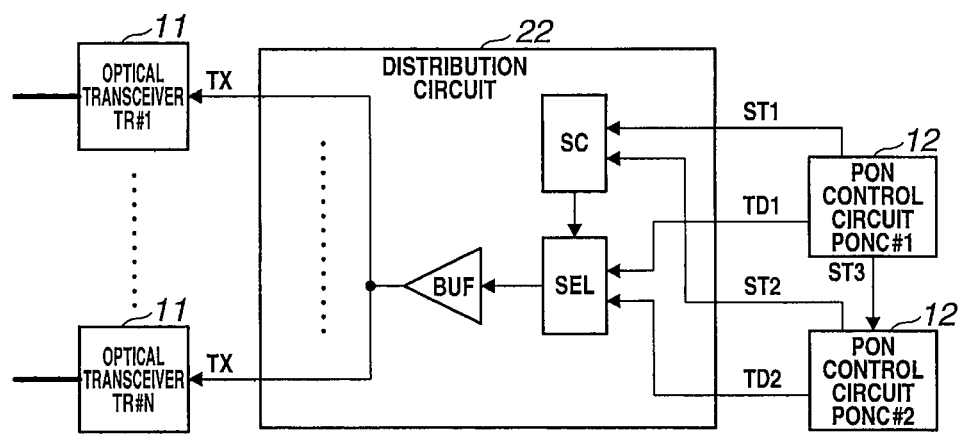
FIG. 9B is a block diagram showing an arrangement example of a distribution circuit according to the fourth embodiment.

When the selection and distribution circuit 13 shown in FIG. 10 according to this embodiment is applied to a plurality of PON control circuits 12, the selection and distribution circuit 13, the selection circuit 21, and the distribution circuit 22 shown in FIGS. 8, 9A, and 9B described above may be applied, as in the fourth embodiment.

Sixth Embodiment

Figure 12:
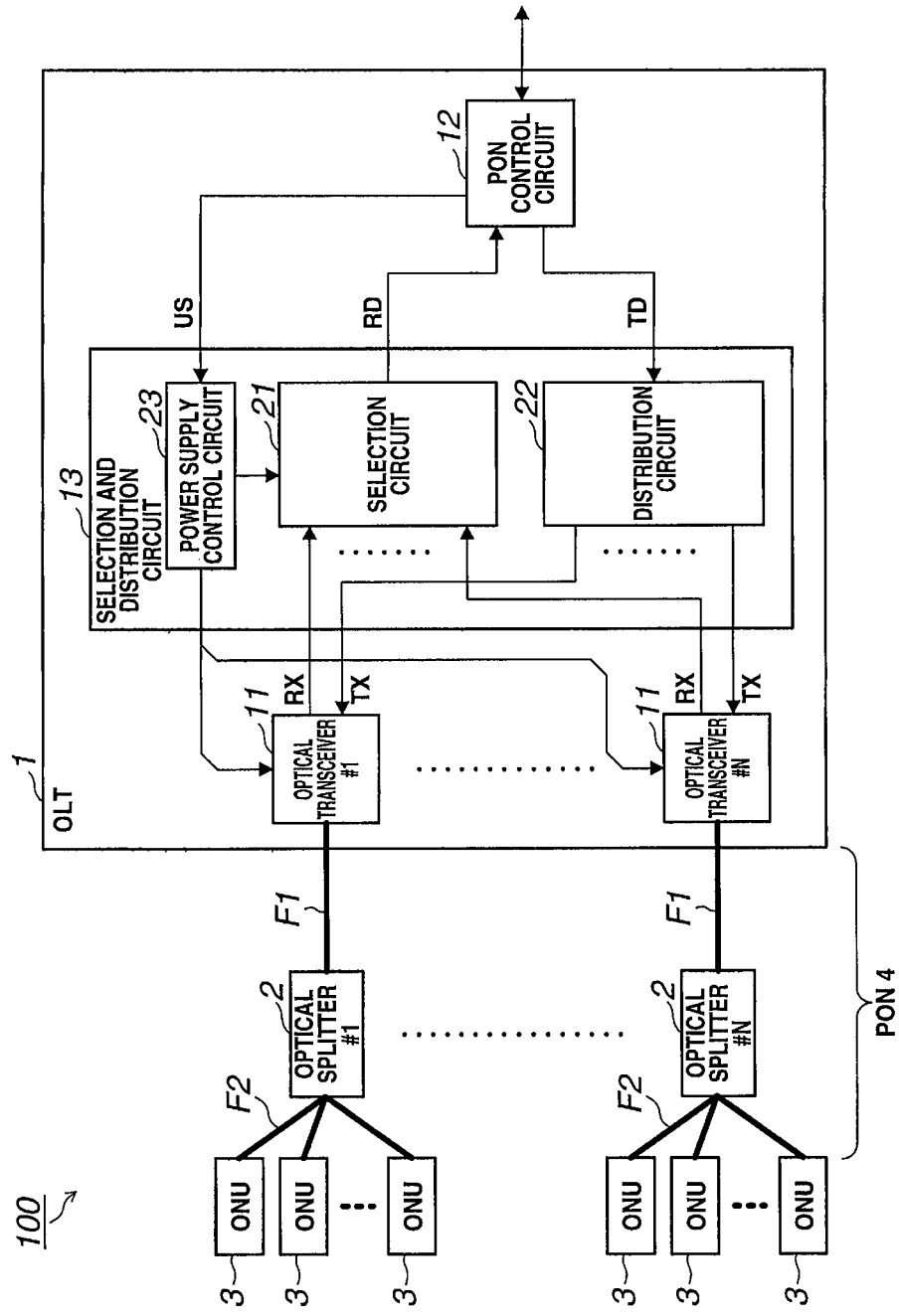
FIG. 12 is a block diagram showing the arrangement of an optical transmission system and an OLT according to the sixth embodiment.

An optical transmission system 100 and an OLT (station-side device) 1 according to the sixth embodiment of the present invention will be described next with reference to FIG. 12. FIG. 12 is a block diagram showing the arrangement of the optical transmission system and the OLT according to the sixth embodiment.

In this embodiment, as a detailed example of power supply control in the above-described first embodiment, a power supply control circuit 23 stops power supply to some or all of circuits in a selection and distribution circuit 13, which are not used to transfer an upstream frame, based on an upstream band allocation status US representing the arrival time periods in which upstream frames time-divisionally arrive.

[Arrangement Example 1 of Selection Circuit and Power Supply Control Circuit]

An arrangement example of a selection circuit 21 and the power supply control circuit 23 according to this embodiment will be described with reference to FIGS. 13A and 13B.

When the power supply control circuit 23 is provided for the selection circuit 21 shown in FIG. 12, power supply to circuit portions corresponding to optical transceivers 11 (TR#1 to TROT) at which no upstream frame has arrived can be stopped, and power consumption can be reduced.

Figure 13A:
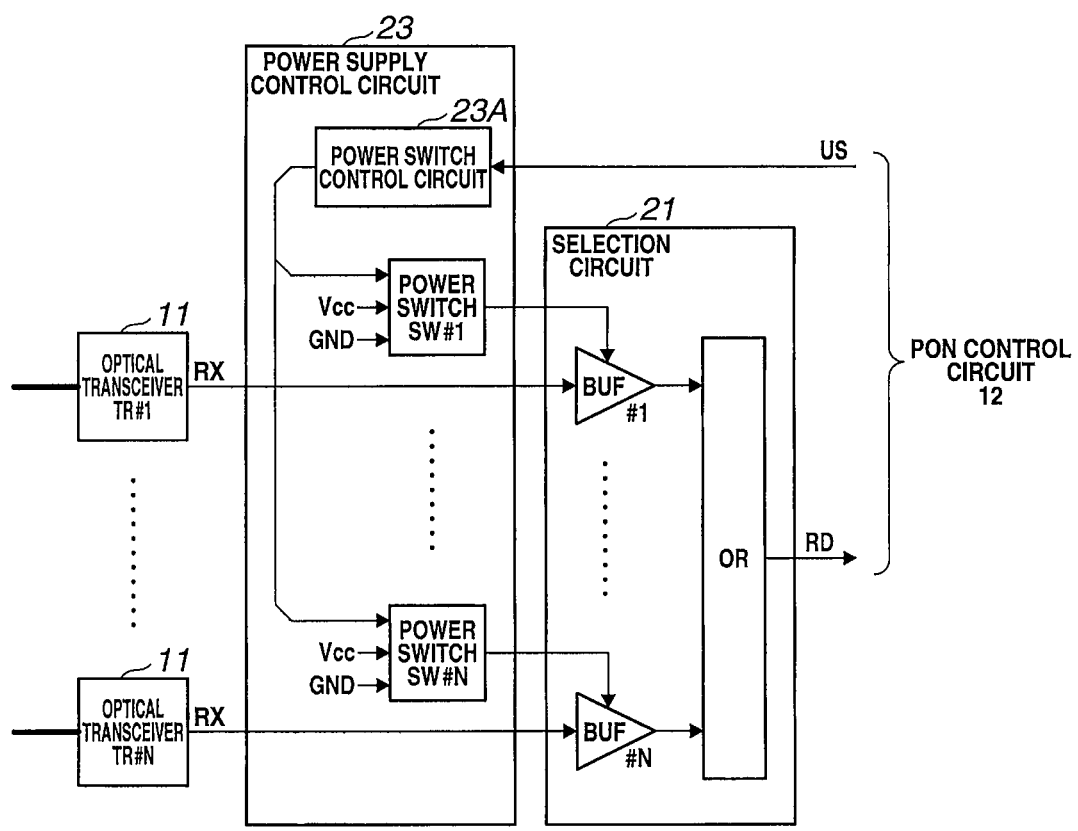
FIG. 13A is a block diagram showing an arrangement example of a selection circuit and a power supply control circuit according to the sixth embodiment.

FIG. 13A shows an arrangement example of the selection circuit and the power supply control circuit according to the sixth embodiment. An arrangement example in which the power supply control circuit 23 is provided for the selection circuit 21 shown in FIG. 3A is illustrated. Note that a distribution circuit 22 can be the same as the arrangement example shown in FIG. 3B.

The selection circuit 21 has a function of causing N buffer circuits (BUF#1 to BUF#N) provided in correspondence with the respective optical transceivers 11 (TR#1 to TR#N) to amplify the signals of upstream frames opto-electrically converted by the optical transceivers 11 (TR#1 to TR#N) and output the signals and causing an OR circuit (OR) to generate the OR output of the signals of the upstream frames output from the buffer circuits (BUF#1 to BUF#N) and output the OR output to a PON control circuit 12.

The power supply control circuit 23 has a function of causing power switches (SW#1 to SW#N) to control power supply to buffer circuits (BUF#1 to BUF#N) corresponding to the optical transceivers 11 (TR#1 to TR#N) based on the upstream band allocation status US concerning each of the optical transceivers 11 (TR#1 to TR#N), which is output from the PON control circuit 12.

As shown in FIG. 13A, the power supply control circuit 23 includes, as main circuit portions, a power switch control circuit 23A and the N power switches (SW#1 to SW#N) corresponding to the respective optical transceivers 11 (TR#1 to TR#N).

The power switch control circuit 23A has a function of controlling the power switches (SW#1 to SW#N) corresponding to the optical transceivers 11 (TR#1 to TR#N) in synchronism with upstream frame outputs RX output from the optical transceivers 11 (TR#1 to TR#N) based on the upstream band allocation status US output from the PON control circuit 12.

The power switches (SW#1 to SW#N) have a function of selectively supplying one of an operating potential Vcc and a ground potential GND to circuit portions, for example, the buffer circuits (BUF#1 to BUF#N) in the selection circuit 21 corresponding to the optical transceivers 11 (TR#1 to TR#N) based on an instruction from the power switch control circuit 23A.

Each of the buffer circuits (BUF#1 to BUF#N) is formed from an amplification circuit such as an operational amplifier, and has a function of amplifying the signal of an upstream frame input from a corresponding one of the optical transceivers 11 (TR#1 to TR#N) and outputting the signal to the OR circuit (OR) in a case of supply of the operating potential Vcc from a corresponding one of the power switches (SW#1 to SW#N), and a function of stopping the amplification operation and outputting the ground potential GND in a case of supply of the ground potential GND from the corresponding one of the power switches (SW#1 to SW#N).

Figure 13B:
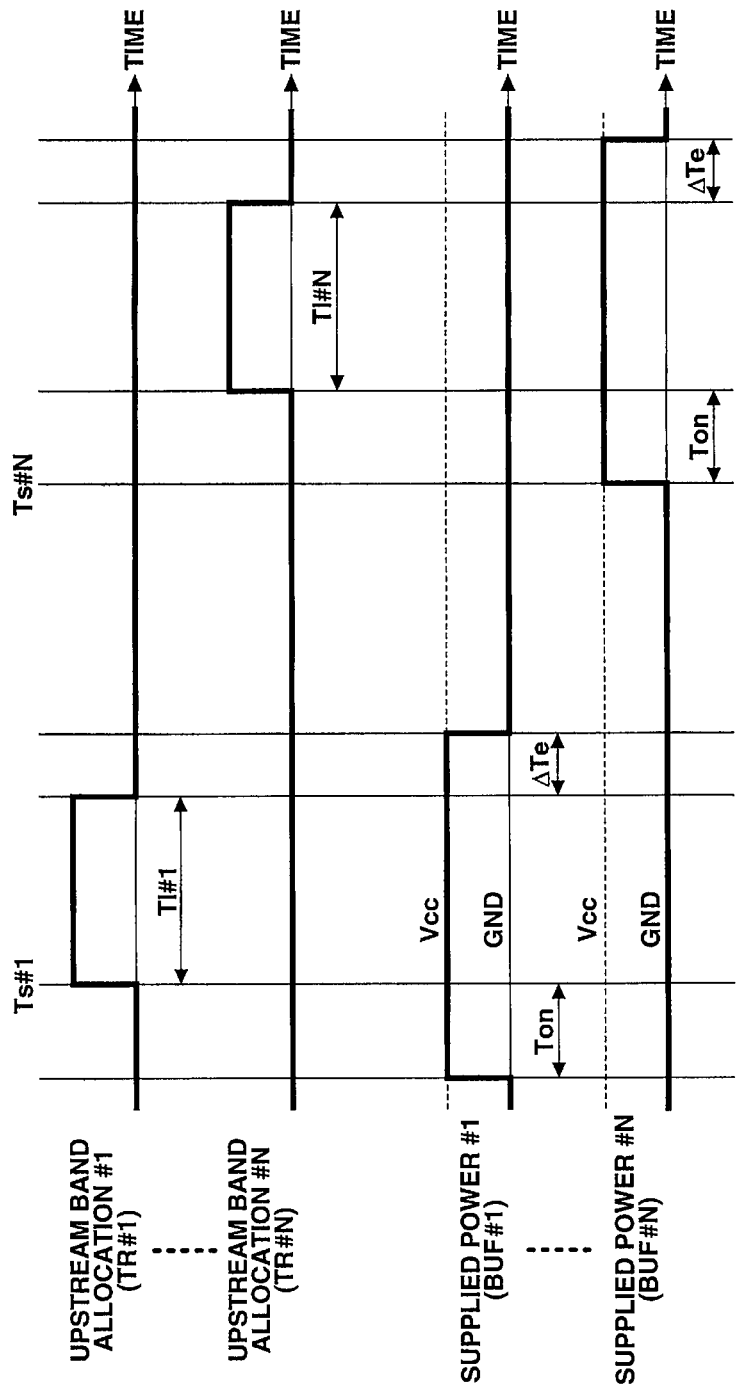
FIG. 13B is a timing chart showing the operation of the power supply control circuit shown in FIG. 13A.

FIG. 13B is a timing chart showing the operation of the power supply control circuit shown in FIG. 13A. The upstream band allocation status US is information representing the arrival time periods in which upstream frames time-divisionally arrive from each ONU 3 connected to the optical transceivers 11 (TR#1 to TR#N), which is generated by the PON control circuit 12 for each of the optical transceivers 11 (TR#1 to TR#N) based on the allocation status of an upstream frame transmission communication band time-divisionally allocated to each ONU 3. The upstream band allocation status US is formed from, for example, an upstream frame arrival time Ts from each ONU 3 and an upstream frame length Tl, and is output for each of the optical transceivers 11 (TR#1 to TR#N), as shown in FIG. 13B.

In accordance with the period of arrival of an upstream frame at each of the optical transceivers 11 (TR#1 to TR#N) based on the upstream band allocation status US, the power switch control circuit 23A instructs the power switches (SW#1 to SW#N) corresponding to the optical transceivers 11 (TR#1 to TR#N) to supply power to the buffer circuits (BUF#1 to BUF#N) corresponding to the optical transceivers 11 (TR#1 to TR#N).

At this time, considering the start delay of the power switches (SW#1 to SW#N) and the buffer circuits (BUF#1 to BUF#N) and the delay of an upstream frame, the power switch control circuit 23A may specify a power supply period with a margin from a point of time gone back from the upstream frame arrival time Ts by a time Ton to a point of time elapsed from the upstream frame termination time Ts+Tl by a delay time ΔTe and instruct to supply power during the power supply period.

Accordingly, even the OLT 1 including the plurality of optical transceivers 11 (TR#1 to TR#N) can correctly control power supply to subsequent stage circuits provided for the optical transceivers 11 (TR#1 to TR#N). It is therefore possible to implement a stable operation by suppressing an influence on the upstream frame transfer operation caused by power consumption reduction of the subsequent stage circuits while properly reducing power consumption in the subsequent stage circuits.

Note that the power supply period may be included in the upstream frame transmission communication band by the PON control circuit 12. To do this, however, a unique band allocation algorithm configured to include an operation characteristic such as the activation time of a circuit component as a target of power supply as a parameter upon band allocation processing is necessary, resulting in a complex band allocation algorithm. According to this embodiment, the power switch control circuit 23A specifies the power supply period based on the communication band allocation status notified to each ONU 3. For this reason, the band allocation algorithm need not be changed. It is also possible to implement the highly adaptive OLT 1 capable of coping with any band allocation algorithm.

Accordingly, during a period when an upstream frame arrives, the power switches (SW#1 to SW#N) supply the operating potential Vcc to the buffer circuits (BUF#1 to BUF#N). During a period when no upstream frame arrives, the power switches (SW#1 to SW#N) stop supplying the operating potential Vcc to the buffer circuits (BUF#1 to BUF#N).

Hence, since supply of the operating potential Vcc is stopped for the buffer circuits (BUF#1 to BUF#N) at which no upstream frame arrives, wasteful power consumption is suppressed, and power consumption in the selection circuit 21 is reduced. Additionally, in place of the AND circuits (AND#1 to AND#N) shown in FIG. 3A, the buffer circuits (BUF#1 to BUF#N) mask (gating) the upstream frame outputs RX by the upstream band allocation status US.

Note that the selection circuit 21 shown in FIG. 12 according to this embodiment is not limited to the arrangement example shown in FIG. 13A, and the selection circuit 21 shown in FIG. 3A or 4 described above may be applied, as in the second embodiment.

When the selection and distribution circuit 13 shown in FIG. 12 according to this embodiment is applied to a 10G-EPON system, the selection circuit 21 and the distribution circuit 22 shown in FIGS. 5A and 5B described above may be applied, as in the second embodiment. Alternatively, the selection circuit 21 shown in FIG. 6 described above may be applied in place of the selection circuit 21 shown in FIG. 5A.

When the selection and distribution circuit 13 shown in FIG. 12 according to this embodiment is applied to a plurality of PON control circuits 12, the selection and distribution circuit 13, the selection circuit 21, and the distribution circuit 22 shown in FIGS. 8, 9A, and 9B described above may be applied, as in the fourth embodiment.

As for the selection circuit 21 shown in FIG. 12 according to this embodiment, the selection circuit 21 shown in FIG. 7 may be applied, as in the third embodiment. This can stop power supply to circuit portions corresponding to the optical transceivers 11 (TR#1 to TR#N) to which no optical signal from the optical splitters 2 is input and reduce power consumption.

[Arrangement Example 2 of Selection Circuit and Power Supply Control Circuit]

Figure 14A:
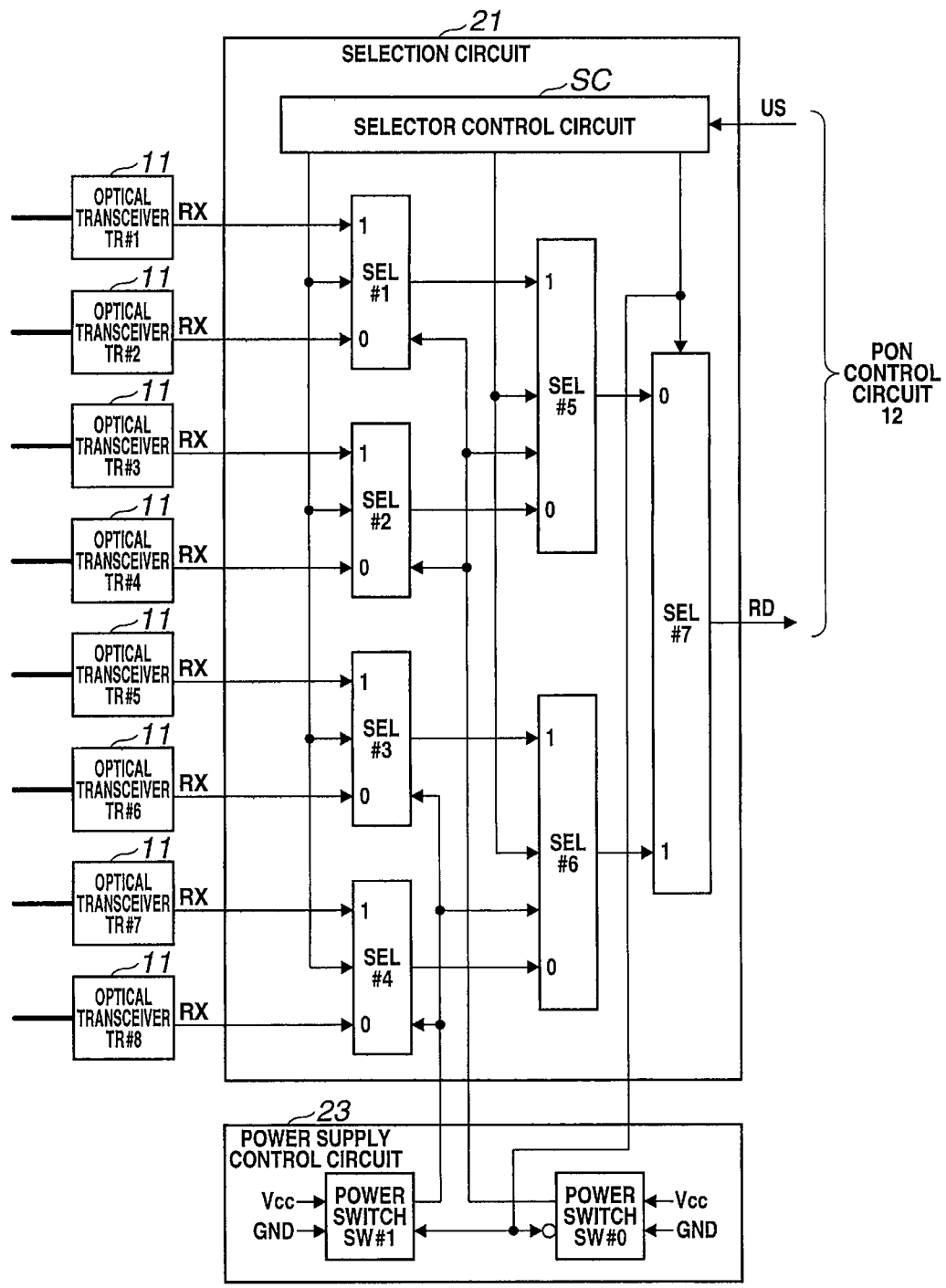
FIG. 14A is a block diagram showing another arrangement example of the selection circuit and the power supply control circuit according to the sixth embodiment.

FIG. 14A shows another arrangement example of the selection circuit and the power supply control circuit according to the sixth embodiment. An arrangement example in which the power supply control circuit 23 is provided for the selection circuit 21 shown in FIG. 7 is illustrated. Note that the distribution circuit 22 can be the same as the arrangement example shown in FIG. 3B.

The power supply control circuit 23 has a function of, based on the switching control states of selectors (SEL#1 to SEL#7), causing a plurality of power switches (SW#0 and SW#1) to stop power supply to some or all of the selectors (SEL#1 to SEL#7), through which no upstream frame passes, based on the switching control states of the selectors (SEL#1 to SEL#7).

The power supply control circuit 23 includes, as main circuit portions, the power switches #0 and #1.

The power switch (SW#0) has a function of selectively supplying one of the operating potential Vcc and the ground potential GND to the selectors (SEL#1, SEL#2, and SEL#5) based on a switching signal (inverted value) input from the selection circuit 21 to the selector (SEL#7). The power switch (SW#1) has a function of selectively supplying one of the operating potential Vcc and the ground potential GND to the selectors (SEL#3, SEL#4, and SEL#6) based on a switching signal input from the selection circuit 21 to the selector (SEL#7).

FIG. 14B is a timing chart showing the operation of the power supply control circuit shown in FIG. 14A. The upstream band allocation status US is information representing the arrival time periods in which upstream frames time-divisionally arrive from each ONU 3 connected to the optical transceivers 11 (TR#1 to TR#N), which is generated by the PON control circuit 12 for each of the optical transceivers 11 (TR#1 to TR#N) based on the allocation status of an upstream frame transmission communication band time-divisionally allocated to each ONU 3. The upstream band allocation status US is formed from, for example, the upstream frame arrival time Ts from each ONU 3 and the upstream frame length Tl, and is output for each of the optical transceivers 11 (TR#1 to TR#N), as shown in FIG. 14B.

Based on the upstream band allocation status US, the selection circuit 21 instructs the selector SEL#7 to switch to the "0"-side input for the upstream frame arrival time periods concerning the optical transceivers TR#1 to TR#4 of the optical transceivers TR#1 to TR#N, and instructs the selector SEL#7 to switch to the "1"-side input for the upstream frame arrival time periods concerning the optical transceivers TR#5 to TR#8.

Accordingly, for example, if the input on the "0" side is selected by the selector SEL#7, the power switch SW#0 supplies the operating potential Vcc to the selectors SEL#1, SEL#2, and SEL#5, and the power switch SW#1 stops power supply to the selectors SEL#3, SEL#4, and SEL#6. On the other hand, if the input on the "1" side is selected by the selector SEL#7, the power switch SW#0 stops power supply to the selectors SEL#1, SEL#2, and SEL#5, and the power switch SW#1 supplies the operating potential Vcc to the selectors SEL#3, SEL#4, and SEL#6.

Hence, since supply of the operating potential Vcc to the half of the selectors SEL#1 to SEL#6 is stopped, wasteful power consumption is suppressed, and power consumption in the selection circuit 21 is reduced.

Note that considering the start delay of the power switches SW#0 and SW#1 and selectors SEL#1 to SEL#7 and the delay of an upstream frame, the selection circuit 21 may calculate a power supply period with a margin from a point of time gone back from the upstream frame arrival time Ts by the time Ton to a point of time elapsed from the upstream frame termination time Ts+Tl by the delay time ΔTe and instruct to supply power during the power supply period. This can implement stable upstream frame transfer processing.

Seventh Embodiment

An OLT 1 according to the seventh embodiment of the present invention will be described next with reference to FIG. 15.

Figure 15:
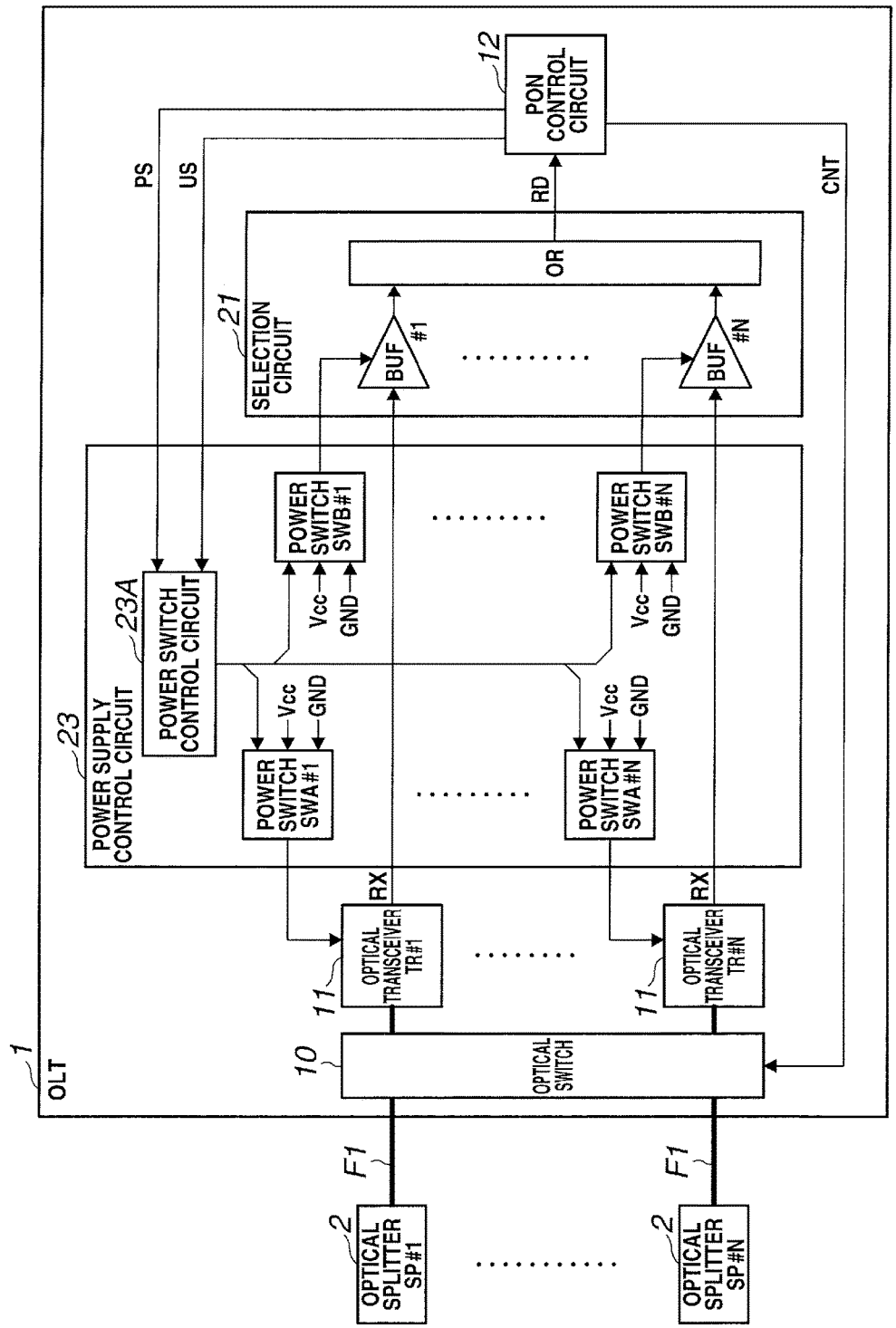
FIG. 15 is a block diagram showing the arrangement of an OLT according to the seventh embodiment.

FIG. 15 is a block diagram showing the arrangement of the OLT according to the seventh embodiment. This arrangement is different from the arrangement shown in FIG. 3C described above in that N×N optical switches 10 configured to arbitrarily selectively connect optical splitters 2 (SP#1 to SP#N) and optical transceivers 11 (TR#1 to TR#N) are provided between the optical splitters 2 (SP#1 to SP#N) and the optical transceivers 11 (TR#1 to TR#N).

If a fault has occurred in one of the optical transceivers 11 (TR#1 to TR#N), to recover frame communication of ONUs 3 accommodated in the optical splitter SP#2 connected to the optical transceiver 11 TR#i, the optical splitter SP#2 needs to be connected to another usable alternative optical transceiver 11 TR#j (j is an integer of 1 to N).

Here, an optical transmission system 100 is generally provided with a mechanism that causes the OLT 1 or another communication device connected to the OLT 1 to detect a fault that occurs in the optical transceiver 11 and notify the operator of it. Hence, as a recovery operation by the operator according to this notification, the setting of an operation status PS of the optical transceiver 11 in which a fault has occurred is changed to "rest", and the setting of the operation status PS of the alternative optical transceiver 11 is changed to "operating", as described with reference to FIG. 2C.

In this embodiment, placing focus on the fact that the setting of the operation status PS of each of the optical transceivers 11 (TR#1 to TR#N) managed by a PON control circuit 12 is changed by the operator in accordance with the occurrence of a fault in the optical transceivers 11 (TR#1 to TR#N), the optical switch 10 is switching-controlled from the PON control circuit 12 based on the operation status PS, thereby selectively connecting the optical splitters 2.

That is, the PON control circuit 12 according to this embodiment has a function of, if the operation status PS of the first optical transceiver 11 (TR#i) of the optical transceivers TR#1 to TR#N is changed to "rest", and the operation status PS of the second optical transceiver 11 (TR#j) is changed to "operating", switching-controlling the optical switch 10 by an optical switch control signal CNT to selectively connect the optical splitter 2 connected to the first optical transceiver (TR#i) to the second optical transceiver 11 (TR#j).

Accordingly, as in FIG. 3C, the optical switch 10 is automatically switching-controlled by the PON control circuit 12 in accordance with the change of the operation statuses PS of the optical transceivers TR#i and TR#j by the recovery operation of the operator. Hence, since the optical splitter SP#i connected to the optical transceiver TR#i with the fault is selectively connected to the alternative optical transceiver TR#j, the frame communication of the ONUs 3 accommodated in the optical splitter SP#i can be recovered.

Additionally, in accordance with the change of the operation statuses PS, a power switch control circuit 23A of a power supply control circuit 23 instructs first and second power switches SWA#i and SWB#i corresponding to the optical transceiver TR#i with the fault to stop power supply, and also instructs first and second power switches SWA#j and SWB#j corresponding to the alternative optical transceiver TR#j to start power supply. Accordingly, power supply from the first and second power switches SWA#i and SWB#i to the optical transceiver TR#i and a buffer circuit BUF#i is stopped, and power supply from the first and second power switches SWA#j and SWB#j to the optical transceiver TR#j and a buffer circuit BUF#j is started.

A case in which the optical switch 10 is switching-controlled in accordance with the change of the operation status PS by the operator has been described above as an example. However, if fault occurrence in the optical transceivers 11 (TR#1 to TR#N) is monitored by the PON control circuit 12, the PON control circuit 12 may autonomously change the operation status PS and switching-control the optical switch 10.

As for fault monitoring of the optical transceivers 11 (TR#1 to TR#N) by the PON control circuit 12, for example, the frame interval of upstream frames transferred from the selection and distribution circuit 13 is monitored for each of the optical transceivers TR#1 to TR#N, and if the optical transceiver TR#i for which the frame interval exceeds a predetermined monitor interval has occurred, the optical transceiver TR#i is determined as the fault optical transceiver 11 (TR#i).

As for the alternative optical transceiver 11 (TR#j), one optical transceiver 11 TR#j other than the optical transceiver TR#i, which is usable and has the operation status PS "rest", is selected as the optical transceiver TR#j. Note that since the optical transceivers 11 (TR#1 to TR#N) with the operation status PS "rest" also include optical transceivers that have a fault and are unusable, information representing the use enable/disable state of each of the optical transceivers TR#1 to TR#N is added to the operation status PS.

Hence, if one of the optical transceivers TR#1 to TR#N is determined as the fault optical transceiver 11 (TR#i), the PON control circuit 12 changes the operation status PS of the optical transceiver TR#i to "rest" and "unusable", selects one of the other alternative optical transceivers 11 (TR#j) which have the operation status PS "rest" and are usable, changes the operation status PS to "operating", and switching-controls the optical switch 10 to selectively connect the optical splitter 2 connected to the fault optical transceiver TR#i to the alternative optical transceiver TR#j.

Accordingly, the operation status PS is autonomously changed by the PON control circuit 12, and the optical switch 10 is switching-controlled without waiting for a change of the operation status PS by the operator. Also, power supply to the fault optical transceiver TR#i and the corresponding buffer circuit BUF#i is automatically stopped by a corresponding to one of the first power switches (SWA#1 to SWA#N) and a corresponding one of the second power switches (SWB#1 to SWB#N), and power supply to the alternative optical transceiver TR#j and the corresponding buffer circuit BUF#j is automatically stared in accordance with an instruction from the power switch control circuit 23A according to the change of the operation status PS.

It is therefore possible to automate the recovery operation of the operator that is needed in a case of fault occurrence in the optical transceivers 11 (TR#1 to TR#N) and largely reduce the operation load, and also largely shorten the time needed for recovery.

Note that the optical switch 10 according to this embodiment shown in FIG. 15 can be applied not only to the arrangement example shown in FIG. 3C but also to the arrangement example shown in FIG. 11 or FIG. 13A described above.

Eighth Embodiment

An OLT 1 according to the eighth embodiment of the present invention will be described next with reference to FIG. 16.

Figure 16:
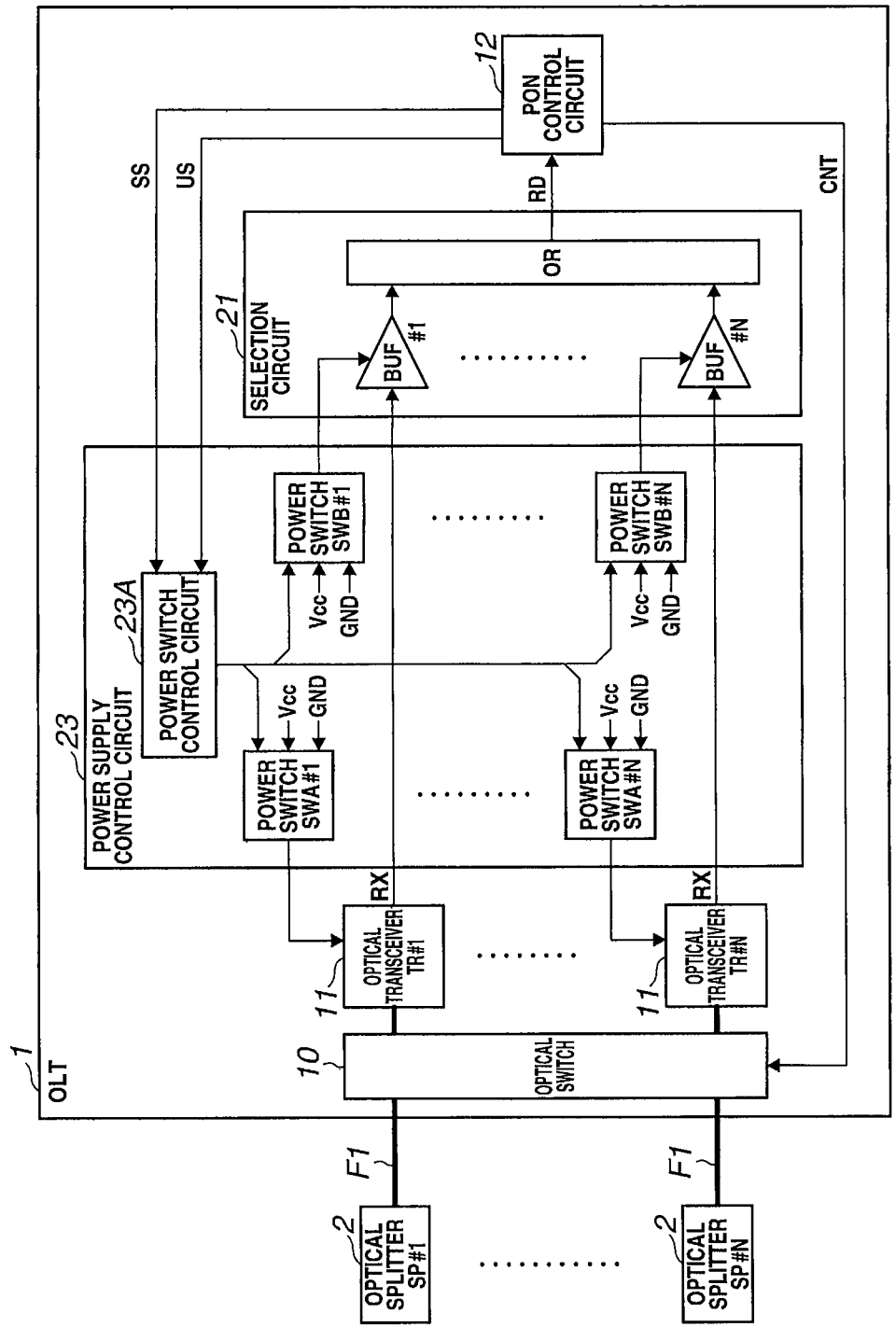
FIG. 16 is a block diagram showing the arrangement of an OLT according to the eighth embodiment.
Figure 17:
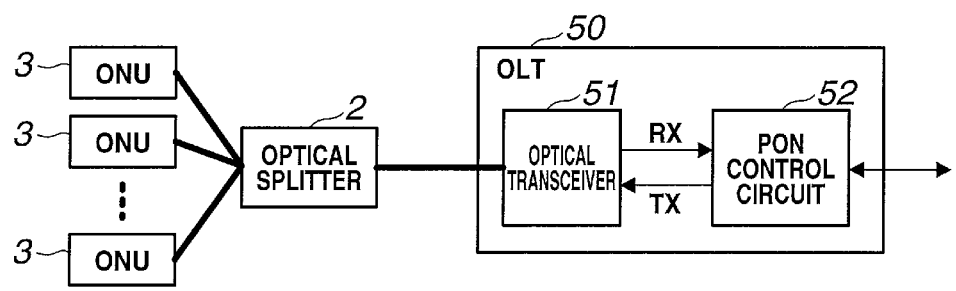
FIG. 17 is a block diagram showing an arrangement example of a conventional GE-PON system.

FIG. 16 is a block diagram showing the arrangement of the OLT according to the eighth embodiment. This arrangement is different from the arrangement shown in FIG. 11 in that N×N optical switches 10 configured to arbitrarily selectively connect optical splitters 2 (SP#1 to SP#N) and optical transceivers 11 (TR#1 to TR#N) are provided between the optical splitters 2 (SP#1 to SP#N) and the optical transceivers 11 (TR#1 to TR#N), and a different downstream wavelength is used for each optical transceiver 11.

As described above, if the sleep periods of connected ONUs 3 overlap in one of the optical transceivers 11 (TR#1 to TR#N), and all the ONUs 3 are in a sleep state only during the sleep overlap period, frame communication is not substantially performed between the optical transceiver 11 and the corresponding optical splitter 2.

Hence, if such a status is intentionally created, that is, if the ONUs 3 in the sleep state is selectively connected to the specific optical transceiver 11, power supply to the optical transceiver 11 can be stopped.

In the present invention, as described above, a PON control circuit 12 performs upstream band allocation (grant allocation) of time-divisionally allocating a communication band for upstream frame transmission to all the ONUs 3 that have established sessions with the OLT 1 in the maximum number of N×32 ONUs 3 connected to the N optical splitters 2 (SP#1 to SP#N) such that the ONUs 3 emit light (transmit upstream frames) at different times.

Hence, as shown in FIG. 16, if the optical switch 10 is provided between the optical transceivers 11 (TR#1 to TR#N) and the optical splitters 2 (SP#1 to SP#N), and the optical switch 10 is switching-controlled in accordance with the timing of upstream band allocation to the ONUs 3, each ONU 3 can individually be connected to an arbitrary optical transceiver 11.

As for the downstream link, a wavelength variable ONU is used as the ONU 3 to be connected, and the downstream wavelength of the optical transceiver 11 to be connected is selected based on an instruction from the OLT 1, thereby connecting the ONU 3 to the arbitrary optical transceiver 11.

In this embodiment, using this mechanism, the ONU 3 in a sleep state is selectively connected to the specific optical transceiver 11, and power supply to the optical transceiver 11 is stopped.

That is, the PON control circuit 12 according to this embodiment has a function of switching-controlling the optical switch 10 by an optical switch control signal CNT based on the sleep status and an upstream band allocation status US of each subscriber-side device, and a function of controlling the ONU 3.

A power supply control circuit 23 has a function of stopping power supply to the sleeping optical transceiver TR#i.

In this embodiment as well, when intermittently stopping power supply to the sleeping optical transceiver TR#i only during a specific power supply stop period, only the ONUs 3 in the sleep state are connected to the optical transceiver TR#i only during the power supply stop period, and connection of the ONUs 3 in a communication state is prohibited. For a period other than the power supply stop period, the ONUs 3 in the sleep state may be selectively connected. The power supply stop period may be periodically set. Alternatively, a period in which more ONUs 3 are set in the sleep state may be selected in accordance with the sleep status.

Hence, as the method of selecting the optical transceiver TR#i to stop power supply, a method of selecting one of the optical transceivers 11 (TR#1 to TR#N) as the optical transceiver TR#i by a technique such as round robin is usable. Alternatively, of the optical transceivers 11 (TR#1 to TR#N), an optical transceiver including the maximum number of ONUs 3 in the sleep state or an optical transceiver including the minimum number of ONUs 3 in the communication state may be selected to reduce the switching operation of the optical switch 10.

Accordingly, as compared to a case in which in one of the optical transceivers 11 (TR#1 to TR#N), power supply to the optical transceiver 11 is stopped during the sleep overlap period in which the sleep periods of the connected ONUs 3 overlap, power supply to the sleeping optical transceiver TR#i can be stopped at a higher frequency. It is therefore possible to more efficiently reduce the power consumption of the entire OLT 1.

Additionally, in the arrangement shown in FIG. 16, selective connection may be performed by changing the upstream wavelength for each optical transceiver 11 of the OLT 1, changing the optical switch 10 to a wavelength selection type switch and the ONU 3 to a wavelength variable ONU, and changing the upstream wavelength of the ONU 3 in accordance with an instruction from the OLT 1. In this case, switching control of the optical switch 10 according to the timing of the upstream band allocation status US is unnecessary (automatic switching is done based on the wavelength).

In the arrangement shown in FIG. 16, selective connection may be performed by the optical switch 10 by adding the identification information of the connected optical transceiver 11 to the start of data to be output from the ONU 3. In this case, switching control of the optical switch 10 according to the timing of the upstream band allocation status US is unnecessary (automatic switching is done based on the identification information). All the optical transceivers 11 and the ONUs 3 of the OLT 1 can use the same wavelength in the upstream link (a wavelength variable device need not be used).

Note that the optical switch 10 according to this embodiment shown in FIG. 16 can be applied not only to the arrangement example shown in FIG. 11 but also to the arrangement example shown in FIG. 3C or FIG. 13A described above.

Extension of Embodiments

The present invention has been described above with reference to the embodiments. However, the present invention is not limited to the above embodiments. Various changes and modifications understandable by those who are skilled in the art can be done for the arrangements and details of the present invention without departing the scope of the present invention. In addition, the embodiments can be arbitrarily combined and executed within a consistent scope.

For example, the optical transceivers 11 and the selection circuits 21 shown in FIGS. 4, 5A, 6, 7, and 9A are not included in the power supply control target. However, a change may be done to perform power supply control like the optical transceivers 11 and selection circuit 21 shown in FIG. 3C.

Note that power supply control of the selection circuit 21 may be done for each optical transceiver 11 but for a plurality of optical transceivers 11. For example, if the selection circuit 21 shown in FIG. 7 is the power supply control target, power supply to the selector SEL#1 is also stopped when stopping power supply to both the optical transceivers TR#1 and TR#2. When performing power supply control based on the upstream band allocation status US by the selection circuit 21 shown in FIG. 7, power supply to four selectors other than three selectors that need power supply in the selectors SEL#1 to SEL#7 may be stopped.

EXPLANATION OF THE REFERENCE NUMERALS AND SIGNS

100 . . . optical transmission system, 1 . . . OLT (station-side device), 2, SP . . . optical splitter, 3 . . . ONU (subscriber-side device), 10 . . . optical switch, 11, TR . . . optical transceiver, 12, PON . . . PON control circuit, 13 . . . selection and distribution circuit, 21 . . . selection circuit, 21A . . . 10-Gbit/s selection circuit, 21B . . . 1-Gbit/s selection circuit, 22 . . . distribution circuit, 23 . . . power supply control circuit, 23A . . . power switch control circuit, AND . . . AND circuit, OR . . . OR circuit, BUF . . . buffer circuit, SEL . . . selector, SC . . . selector control circuit, F1, F2 . . . optical fiber, RX, RD . . . upstream frame output, TX, TD . . . downstream frame output, LOS . . . LOS output, PS . . . operation status, SS . . . sleep status, US . . . upstream band allocation status, ST . . . operation status, CNT . . . optical switch control signal

The invention claimed is:

1. A station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising:

N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices;

a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times;

a selection and distribution circuit configured to select the optical transceivers corresponding to the upstream frame that time-divisionally arrives such that the upstream frames opto-electrically converted by the optical transceivers are transferred to the PON control circuit, and distribute the downstream frames from the PON control circuit to the optical transceivers; and a power supply control circuit configured to stop power supply to at least one of the optical transceivers that are not used to transfer the frame of the optical transceivers and the selection and distribution circuit which is not used to transfer the frames, wherein the power supply control circuit includes N first power switches provided in correspondence with the respective optical transceivers and configured to control power supply to the optical transceivers based on operation statuses of the optical transceivers, and N second power switches provided in correspondence with the respective optical transceivers and configured to control power supply to circuit portions corresponding to the optical transceivers in the selection and distribution circuit based on the operation statuses of the optical transceivers and/or upstream band allocation statuses representing arrival time periods of the upstream frames that arrive time-divisionally.

2. The station-side device according to claim 1, wherein the selection and distribution circuit comprises a selection circuit configured to cause N buffer circuits provided in correspondence with the respective optical transceivers to amplify signals of the upstream frames opto-electrically converted by the optical transceivers and output the signals, and output to the PON control circuit an OR output of the signals of the upstream frames output from the buffer circuits, and the second power switches are configured to control power supply to the buffer circuits.

3. The station-side device according to claim 1, further comprising N×N optical switches configured to selectively connect the optical splitters and the optical transceivers, wherein the PON control circuit switching-controls the optical switches based on sleep statuses of the subscriber-side devices, and the power supply control circuit stops power supply to an optical transceiver in a sleep state of the optical transceivers.

4. An optical transmission system comprising N (N is an integer of not less than 2) optical splitters and a station-side device configured to perform transfer processing of frames between a plurality of subscriber-side devices connected to the station-side device via the optical splitters and a host device, wherein the station-side device comprises a station-side device of claim 1.

5. A station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising:

N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices;

a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times;

a selection and distribution circuit configured to select the optical transceivers corresponding to the upstream frame that time-divisionally arrives such that the upstream frames opto-electrically converted by the optical transceivers are transferred to the PON control circuit, and distribute the downstream frames from the PON control circuit to the optical transceivers; and a power supply control circuit configured to stop power supply to at least one of the optical transceivers that are not used to transfer the frame of the optical transceivers and the selection and distribution circuit which is not used to transfer the frames, wherein the power supply control circuit comprises N first power switches provided in correspondence with the respective optical transceivers and configured to control power supply to the optical transceivers based on the optical-transceiver-specific sleep statuses of the optical transceivers, and N second power switches provided in correspondence with the respective optical transceivers and configured to control power supply to circuit portions corresponding to the optical transceivers in the selection and distribution circuit based on the optical-transceiver-specific sleep statuses of the optical transceivers and/or upstream band allocation statuses representing arrival time periods of the upstream frames that arrive time-divisionally.

6. The station-side device according to claim 5, wherein the selection and distribution circuit comprises a selection circuit configured to cause N buffer circuits provided in correspondence with the respective optical transceivers to amplify signals of the upstream frames opto-electrically converted by the optical transceivers and output the signals, and output an OR output of the signals of the upstream frames output from the buffer circuits to the PON control circuit, and the second power switches are configured to control power supply to the buffer circuits.

7. A station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising:

N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices;

a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times;

a selection and distribution circuit configured to select the optical transceivers corresponding to the upstream frame that time-divisionally arrives such that the upstream frames opto-electrically converted by the optical transceivers are transferred to the PON control circuit, and distribute the downstream frames from the PON control circuit to the optical transceivers; and a power supply control circuit configured to stop power supply to at least one of the optical transceivers that are not used to transfer the frame of the optical transceivers and the selection and distribution circuit which is not used to transfer the frames, wherein the power supply control circuit comprises N power switches provided in correspondence with the respective optical transceivers and configured to control power supply to circuit portions corresponding to the optical transceivers in the selection and distribution circuit based on upstream band allocation statuses representing arrival time periods of the upstream frames that arrive time-divisionally in accordance with the arrival time periods of the upstream frames that arrive at the optical transceivers.

8. The station-side device according to claim 7, wherein the selection and distribution circuit comprises a selection circuit configured to cause N buffer circuits provided in correspondence with the respective optical transceivers to amplify signals of the upstream frames opto-electrically converted by the optical transceivers and output to the PON control circuit an OR output of the signals of the upstream frames output from the buffer circuits, and the power switches are configured to control power supply to the buffer circuits.

9. A station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising:

N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices;

a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times;

a selection and distribution circuit configured to select the optical transceivers corresponding to the upstream frame that time-divisionally arrives such that the upstream frames opto-electrically converted by the optical transceivers are transferred to the PON control circuit, and distribute the downstream frames from the PON control circuit to the optical transceivers; and a power supply control circuit configured to stop power supply to at least one of the optical transceivers that are not used to transfer the frame of the optical transceivers and the selection and distribution circuit which is not used to transfer the frames, wherein the selection and distribution circuit comprises a selection circuit configured to perform switching control of a plurality of selectors based on upstream band allocation statuses representing arrival time periods of the upstream frames that arrive time-divisionally so as to select the optical transceivers corresponding to the upstream frames that time-divisionally arrive, and transfer the upstream frame opto-electrically converted by the optical transceiver to the PON control circuit, the power supply control circuit stops power supply to some or all of circuits in the selection circuit not used for transferring the upstream frames based on the upstream band allocation statuses, and the power supply control circuit comprises a plurality of power switches configured to stop power supply to, of the selectors, some or all of the selectors through which no upstream frame passes, based on switching control states of the selectors.

10. A station-side device used in an optical transmission system that includes N (N is an integer of not less than 2) optical splitters and the station-side device that is configured to perform transfer processing of frames between a plurality of subscriber-side devices connected to the station-side device via the optical splitters and a host device, comprising:

N optical transceivers connected to the optical splitters in a one-to-one correspondence and configured to perform opto-electric conversion of upstream frames from the subscriber-side devices connected to the corresponding optical splitters to the host device and perform electro-optic conversion of downstream frames from the host device to the subscriber-side devices;

a PON control circuit configured to exchange the upstream frames and the downstream frames with the host device and time-divisionally allocate a communication band for upstream frame transmission to the subscriber-side devices such that the upstream frames are transmitted from the respective subscriber-side devices at different times;

a selection and distribution circuit configured to select the optical transceivers corresponding to the upstream frame that time-divisionally arrives such that the upstream frames opto-electrically converted by the optical transceivers are transferred to the PON control circuit, and distribute the downstream frames from the PON control circuit to the optical transceivers;

a power supply control circuit configured to stop power supply to at least one of the optical transceivers that are not used to transfer the frame of the optical transceivers and the selection and distribution circuit which is not used to transfer the frames; and N×N optical switches configured to selectively connect the optical splitters and the optical transceivers to each other, wherein the PON control circuit monitors, for each optical transceiver, a frame interval of the upstream frames transferred from the selection and distribution circuit, when an optical transceiver for which the frame interval exceeds a predetermined monitor interval has occurred, determines the optical transceiver as a fault optical transceiver, changes the operation status to "rest" and "unusable", selects another optical transceiver whose operation status is "rest" and "usable" as an alternative optical transceiver, changes the operation status to "operating", and switching-controls the optical switches to selectively connect the optical splitter connected to the fault optical transceiver to the alternative optical transceiver.

* * * * *